(12) United States Patent
Morrow et al.

(10) Patent No.: US 11,007,860 B2
(45) Date of Patent: May 18, 2021

(54) INLINE ELECTROMECHANICAL VARIABLE TRANSMISSION SYSTEM

(71) Applicant: Oshkosh Corporation, Oshkosh, WI (US)

(72) Inventors: Jon J. Morrow, Neenah, WI (US); David J. Steinberger, Oshkosh, WI (US); Eric E. Braun, Neenah, WI (US); Andrew J. Kotloski, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 16/540,816

(22) Filed: Aug. 14, 2019

(65) Prior Publication Data

US 2019/0366828 A1 Dec. 5, 2019

Related U.S. Application Data

(63) Continuation of application No. 14/918,221, filed on Oct. 20, 2015, now Pat. No. 10,421,350.

(51) Int. Cl.
*B60K 6/365* (2007.10)
*B60K 6/387* (2007.10)
(Continued)

(52) U.S. Cl.
CPC .............. *B60K 6/365* (2013.01); *B60K 6/387* (2013.01); *B60K 6/445* (2013.01); *F16H 3/728* (2013.01);
(Continued)

(58) Field of Classification Search
CPC ........ B60K 6/365; B60K 6/387; B60K 6/445; B60K 2006/381; F16H 2037/0873; F16H 2200/2007; F16H 2200/2041; F16H 3/728
See application file for complete search history.

(56) References Cited

U.S. PATENT DOCUMENTS

| 1,951,089 A | 3/1934 | Fielder |
| 3,524,069 A | 8/1970 | Stepanov et al. |

(Continued)

FOREIGN PATENT DOCUMENTS

| CN | 101107460 | 1/2008 |
| CN | 101194114 A | 6/2008 |

(Continued)

OTHER PUBLICATIONS

US 7,154,246 B1, 12/2006, Heap (withdrawn)
(Continued)

*Primary Examiner* — Tisha D Lewis
(74) *Attorney, Agent, or Firm* — Foley & Lardner LLP

(57) ABSTRACT

A drive system for a vehicle includes first and second gear sets, a connecting shaft and a first electrical machine coupled to the first gear set, a second electrical machine coupled to the second gear set, an output shaft that transports power from the first electrical machine and the second electrical machine to a tractive element of the vehicle, a first clutch selectively rotationally coupling the first gear set to the output shaft when engaged, and a second clutch selectively rotationally coupling the first gear set to the output shaft when engaged. A carrier of the first gear set is selectively coupled to a carrier of the second gear set. The output shaft is aligned with the connecting shaft, the first electrical machine, and the second electrical machine. The first and second clutches are engaged when the drive system is reconfigured into forward and reverse modes of operation, respectively.

17 Claims, 16 Drawing Sheets

(51) Int. Cl.
  *B60K 6/38* (2007.10)
  *F16H 37/08* (2006.01)
  *F16H 3/72* (2006.01)
  *B60K 6/445* (2007.10)

(52) U.S. Cl.
  CPC  *B60K 2006/381* (2013.01); *F16H 2037/0873* (2013.01); *F16H 2200/2007* (2013.01); *F16H 2200/2041* (2013.01); *Y02T 10/62* (2013.01); *Y10S 903/911* (2013.01)

(56) References Cited

U.S. PATENT DOCUMENTS

| | | |
|---|---|---|
| 3,690,559 A | 9/1972 | Rudloff |
| 3,764,867 A | 10/1973 | Smith |
| 3,799,284 A | 3/1974 | Hender |
| 3,865,209 A | 2/1975 | Aihara et al. |
| 3,966,067 A | 6/1976 | Reese |
| 4,021,704 A | 5/1977 | Norbeck |
| 4,088,934 A | 5/1978 | D'Atre et al. |
| 4,097,925 A | 6/1978 | Butler, Jr. |
| 4,113,045 A | 9/1978 | Downing, Jr. |
| 4,196,785 A | 4/1980 | Downing, Jr. |
| 4,292,531 A | 9/1981 | Williamson |
| 4,319,140 A | 3/1982 | Paschke |
| 4,336,418 A | 6/1982 | Hoag |
| 4,347,907 A | 9/1982 | Downing, Jr. |
| 4,411,171 A | 10/1983 | Fiala |
| 4,423,362 A | 12/1983 | Konrad et al. |
| 4,423,794 A | 1/1984 | Beck |
| 4,444,285 A | 4/1984 | Stewart et al. |
| 4,461,988 A | 7/1984 | Plunkett |
| 4,533,011 A | 8/1985 | Heidemeyer et al. |
| 4,562,894 A | 1/1986 | Yang |
| 4,719,361 A | 1/1988 | Brubaker |
| 4,760,275 A | 7/1988 | Sato et al. |
| 4,774,399 A | 9/1988 | Fujita et al. |
| 4,774,811 A | 10/1988 | Kawamura |
| 4,809,177 A | 2/1989 | Windle et al. |
| 4,953,646 A | 9/1990 | Kim |
| 4,966,242 A | 10/1990 | Baillargeon |
| 4,985,845 A | 1/1991 | Goetz et al. |
| 5,067,932 A | 11/1991 | Edwards |
| 5,081,832 A | 1/1992 | Mowill |
| 5,120,282 A | 6/1992 | Fjaellstroem |
| 5,168,946 A | 12/1992 | Dorgan |
| 5,180,456 A | 1/1993 | Schultz et al. |
| 5,195,600 A | 3/1993 | Dorgan |
| 5,201,629 A | 4/1993 | Simpson et al. |
| 5,227,703 A | 7/1993 | Boothe et al. |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,343,971 A | 9/1994 | Heidelberg et al. |
| 5,345,154 A | 9/1994 | King |
| 5,369,540 A | 11/1994 | Konrad et al. |
| 5,389,825 A | 2/1995 | Ishikawa et al. |
| 5,409,425 A | 4/1995 | Shibahata |
| 5,417,299 A | 5/1995 | Pillar et al. |
| 5,418,437 A | 5/1995 | Couture et al. |
| 5,448,561 A | 9/1995 | Kaiser et al. |
| 5,498,208 A | 3/1996 | Braun |
| 5,501,567 A | 3/1996 | Lanzdorf et al. |
| 5,504,655 A | 4/1996 | Underwood et al. |
| 5,508,594 A | 4/1996 | Underwood et al. |
| 5,508,689 A | 4/1996 | Rado et al. |
| 5,516,379 A | 5/1996 | Schultz |
| 5,538,274 A | 7/1996 | Schmitz et al. |
| 5,558,175 A | 9/1996 | Sherman |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,607,028 A | 3/1997 | Braun et al. |
| 5,629,567 A | 5/1997 | Kumar |
| 5,629,603 A | 5/1997 | Kinoshita |
| 5,646,510 A | 7/1997 | Kumar |
| 5,669,470 A | 9/1997 | Ross |
| 5,669,842 A | 9/1997 | Schmidt |
| 5,672,920 A | 9/1997 | Donegan et al. |
| 5,679,085 A | 10/1997 | Fredriksen et al. |
| 5,713,425 A | 2/1998 | Buschhaus et al. |
| 5,722,502 A | 3/1998 | Kubo |
| 5,767,584 A | 6/1998 | Gore et al. |
| 5,786,640 A | 7/1998 | Sakai et al. |
| 5,789,882 A | 8/1998 | Ibaraki et al. |
| 5,813,487 A | 9/1998 | Lee et al. |
| 5,813,488 A | 9/1998 | Weiss |
| 5,820,150 A | 10/1998 | Archer et al. |
| 5,820,258 A | 10/1998 | Braun |
| 5,828,554 A | 10/1998 | Donegan et al. |
| 5,847,520 A | 12/1998 | Theurillat et al. |
| 5,865,263 A | 2/1999 | Yamaguchi et al. |
| 5,879,265 A | 3/1999 | Bek |
| 5,880,570 A | 3/1999 | Tamaki et al. |
| 5,881,559 A | 3/1999 | Kawamura |
| 5,895,333 A | 4/1999 | Morisawa et al. |
| 5,924,879 A | 7/1999 | Kameyama |
| 5,925,993 A | 7/1999 | Lansberry |
| 5,927,417 A | 7/1999 | Brunner et al. |
| 5,934,395 A | 8/1999 | Koide et al. |
| 5,939,794 A | 8/1999 | Sakai et al. |
| 5,947,855 A | 9/1999 | Weiss |
| 5,957,985 A | 9/1999 | Wong et al. |
| 5,973,463 A | 10/1999 | Okuda et al. |
| 5,980,410 A | 11/1999 | Stemler et al. |
| 5,986,416 A | 11/1999 | Dubois |
| 5,991,683 A | 11/1999 | Takaoka et al. |
| 5,998,880 A | 12/1999 | Kumar |
| 6,005,358 A | 12/1999 | Radev |
| 6,012,004 A | 1/2000 | Sugano et al. |
| 6,028,403 A | 2/2000 | Fukatsu |
| 6,038,500 A | 3/2000 | Weiss |
| 6,054,844 A | 4/2000 | Frank |
| 6,086,074 A | 7/2000 | Braun |
| 6,104,148 A | 8/2000 | Kumar et al. |
| 6,105,984 A | 8/2000 | Schmitz et al. |
| 6,110,066 A | 8/2000 | Nedungadi et al. |
| 6,201,310 B1 | 3/2001 | Adachi et al. |
| 6,298,932 B1 | 10/2001 | Bowman et al. |
| 6,356,817 B1 | 3/2002 | Abe |
| 6,371,878 B1 | 4/2002 | Bowen |
| 6,387,007 B1 | 5/2002 | Fini, Jr. |
| 6,404,607 B1 | 6/2002 | Burgess et al. |
| 6,421,593 B1 | 7/2002 | Kempen et al. |
| 6,434,470 B1 | 8/2002 | Nantz et al. |
| 6,478,705 B1 | 11/2002 | Holmes et al. |
| 6,496,393 B1 | 12/2002 | Patwardhan |
| 6,501,368 B1 | 12/2002 | Wiebe et al. |
| 6,516,914 B1 | 2/2003 | Andersen et al. |
| 6,520,494 B1 | 2/2003 | Andersen et al. |
| 6,553,287 B1 | 4/2003 | Supina et al. |
| 6,553,290 B1 | 4/2003 | Pillar |
| 6,561,718 B1 | 5/2003 | Archer et al. |
| 6,563,230 B2 | 5/2003 | Nada |
| 6,575,866 B2 | 6/2003 | Bowen |
| 6,580,953 B1 | 6/2003 | Wiebe et al. |
| 6,607,466 B2 | 8/2003 | Bordini |
| 6,611,116 B2 | 8/2003 | Bachman et al. |
| 6,702,709 B2 | 3/2004 | Bowen |
| 6,722,458 B2 | 4/2004 | Hofbauer |
| 6,726,592 B2 | 4/2004 | Kotani |
| 6,757,597 B2 | 6/2004 | Yakes et al. |
| 6,764,085 B1 | 7/2004 | Anderson |
| 6,793,600 B2 | 9/2004 | Hiraiwa |
| 6,819,985 B2 | 11/2004 | Minagawa et al. |
| 6,846,257 B2 | 1/2005 | Baker et al. |
| 6,852,053 B2 | 2/2005 | Nakano et al. |
| 6,852,054 B2 | 2/2005 | Tumback et al. |

(56) References Cited

U.S. PATENT DOCUMENTS

| | | |
|---|---|---|
| 6,860,332 B1 | 3/2005 | Archer et al. |
| 6,882,917 B2 | 4/2005 | Pillar et al. |
| 6,885,920 B2 | 4/2005 | Yakes et al. |
| 6,886,647 B1 | 5/2005 | Gotta |
| 6,909,944 B2 | 6/2005 | Pillar et al. |
| 6,922,615 B2 | 7/2005 | Pillar et al. |
| 6,953,409 B2 | 10/2005 | Schmidt et al. |
| 6,973,600 B2 | 12/2005 | Lau et al. |
| 6,976,688 B2 | 12/2005 | Archer et al. |
| 6,991,054 B2 | 1/2006 | Takaoka et al. |
| 6,993,421 B2 | 1/2006 | Pillar et al. |
| 6,994,646 B2 | 2/2006 | Ai |
| 7,000,717 B2 | 2/2006 | Ai et al. |
| 7,004,868 B2 | 2/2006 | Oshidari et al. |
| 7,006,902 B2 | 2/2006 | Archer et al. |
| 7,024,296 B2 | 4/2006 | Squires et al. |
| 7,053,566 B2 | 5/2006 | Aizawa et al. |
| 7,072,745 B2 | 7/2006 | Pillar et al. |
| 7,073,620 B2 | 7/2006 | Braun et al. |
| 7,073,847 B2 | 7/2006 | Morrow et al. |
| 7,076,356 B2 * | 7/2006 | Hubbard ............... B60K 6/445 180/65.235 |
| 7,086,977 B2 | 8/2006 | Supina et al. |
| 7,107,129 B2 | 9/2006 | Rowe et al. |
| 7,127,331 B2 | 10/2006 | Pillar et al. |
| 7,140,461 B2 | 11/2006 | Morrow |
| 7,154,236 B1 * | 12/2006 | Heap ..................... B60K 6/365 318/9 |
| 7,162,332 B2 | 1/2007 | Pillar et al. |
| 7,164,977 B2 | 1/2007 | Yakes et al. |
| 7,179,187 B2 | 2/2007 | Raghavan et al. |
| 7,184,862 B2 | 2/2007 | Pillar et al. |
| 7,184,866 B2 | 2/2007 | Squires et al. |
| 7,196,430 B2 | 3/2007 | Yang |
| 7,204,776 B2 | 4/2007 | Minagawa et al. |
| 7,217,211 B2 | 5/2007 | Klemen et al. |
| 7,219,756 B2 | 5/2007 | Bischoff |
| 7,223,200 B2 | 5/2007 | Kojima et al. |
| 7,234,534 B2 | 6/2007 | Froland et al. |
| 7,246,672 B2 | 7/2007 | Shirai et al. |
| 7,254,468 B2 | 8/2007 | Pillar et al. |
| 7,258,194 B2 | 8/2007 | Braun et al. |
| 7,274,976 B2 | 9/2007 | Rowe et al. |
| 7,276,007 B2 | 10/2007 | Takami et al. |
| 7,277,782 B2 | 10/2007 | Yakes et al. |
| 7,282,003 B2 | 10/2007 | Klemen et al. |
| 7,302,320 B2 | 11/2007 | Nasr et al. |
| 7,306,064 B2 | 12/2007 | Imazu et al. |
| 7,322,896 B2 | 1/2008 | Minagawa |
| 7,338,401 B2 | 3/2008 | Klemen et al. |
| 7,357,203 B2 | 4/2008 | Morrow et al. |
| 7,363,996 B2 | 4/2008 | Kamada et al. |
| 7,367,415 B2 | 5/2008 | Oliver et al. |
| 7,367,911 B2 | 5/2008 | Reghavan et al. |
| 7,379,797 B2 | 5/2008 | Nasr et al. |
| 7,392,122 B2 | 6/2008 | Pillar et al. |
| 7,412,307 B2 | 8/2008 | Pillar et al. |
| 7,419,021 B2 | 9/2008 | Morrow et al. |
| 7,439,711 B2 | 10/2008 | Bolton |
| 7,448,460 B2 | 11/2008 | Morrow et al. |
| 7,451,028 B2 | 11/2008 | Pillar et al. |
| 7,462,122 B2 | 12/2008 | Reghavan et al. |
| 7,467,678 B2 | 12/2008 | Tanaka et al. |
| 7,479,080 B2 | 1/2009 | Usoro |
| 7,493,980 B2 | 2/2009 | Hidaka |
| 7,520,354 B2 | 4/2009 | Morrow et al. |
| 7,521,814 B2 | 4/2009 | Nasr |
| 7,522,979 B2 | 4/2009 | Pillar |
| 7,527,573 B2 | 5/2009 | Lang et al. |
| 7,555,369 B2 | 6/2009 | Pillar et al. |
| 7,572,201 B2 | 8/2009 | Supina et al. |
| 7,576,501 B2 | 8/2009 | Okubo et al. |
| 7,597,164 B2 | 10/2009 | Severinsky et al. |
| 7,601,093 B2 | 10/2009 | Tabata et al. |
| 7,635,039 B2 | 12/2009 | Fujiwara et al. |
| 7,678,014 B2 | 3/2010 | Nohara et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,725,225 B2 | 5/2010 | Pillar et al. |
| 7,729,831 B2 | 6/2010 | Pillar et al. |
| 7,749,131 B2 | 7/2010 | Imamura et al. |
| 7,756,621 B2 | 7/2010 | Pillar et al. |
| 7,784,554 B2 | 8/2010 | Grady et al. |
| 7,792,618 B2 | 9/2010 | Quigley et al. |
| 7,811,191 B2 | 10/2010 | Iwase et al. |
| 7,824,293 B2 | 11/2010 | Schimke |
| 7,835,838 B2 | 11/2010 | Pillar et al. |
| 7,848,857 B2 | 12/2010 | Nasr et al. |
| 7,874,373 B2 | 1/2011 | Morrow et al. |
| 7,878,750 B2 | 2/2011 | Zhou et al. |
| 7,888,894 B2 | 2/2011 | Sugawara et al. |
| 7,908,063 B2 | 3/2011 | Sah |
| 7,927,250 B2 | 4/2011 | Imamura et al. |
| 7,931,103 B2 | 4/2011 | Morrow et al. |
| 7,935,021 B2 | 5/2011 | Tabata et al. |
| 7,935,022 B2 | 5/2011 | Iwase et al. |
| 7,937,194 B2 | 5/2011 | Nasr et al. |
| 7,941,259 B2 | 5/2011 | Tabata et al. |
| 7,972,237 B2 | 7/2011 | Ota |
| 8,000,850 B2 | 8/2011 | Nasr et al. |
| 8,007,402 B2 | 8/2011 | Tabata et al. |
| 8,038,572 B2 | 10/2011 | Matsubara et al. |
| 8,062,172 B2 | 11/2011 | Supina et al. |
| 8,068,947 B2 | 11/2011 | Conlon et al. |
| 8,091,662 B2 | 1/2012 | Tolksdorf |
| 8,095,247 B2 | 1/2012 | Pillar et al. |
| 8,123,645 B2 | 2/2012 | Schimke |
| 8,231,491 B2 | 7/2012 | Oba et al. |
| 8,337,352 B2 | 12/2012 | Morrow et al. |
| 8,444,517 B2 | 5/2013 | Gradu et al. |
| 8,459,619 B2 | 6/2013 | Trinh et al. |
| 8,491,438 B2 | 7/2013 | Kim et al. |
| 8,561,735 B2 | 10/2013 | Morrow et al. |
| 8,696,506 B2 | 4/2014 | Kaltenbach et al. |
| 8,788,162 B2 | 7/2014 | Park |
| 8,795,113 B2 | 8/2014 | Grochowski et al. |
| 8,801,318 B2 | 8/2014 | Knoble et al. |
| 8,801,567 B2 | 8/2014 | Demirovic et al. |
| 8,818,588 B2 | 8/2014 | Ambrosio et al. |
| 8,864,613 B2 | 10/2014 | Morrow et al. |
| 8,894,526 B2 | 11/2014 | Kozarekar et al. |
| 8,905,892 B1 | 12/2014 | Lee et al. |
| 9,033,836 B2 | 5/2015 | Hiraiwa |
| 9,114,699 B2 | 8/2015 | Takei et al. |
| 9,114,804 B1 | 8/2015 | Shukla et al. |
| 9,132,736 B1 | 9/2015 | Shukla et al. |
| 9,376,102 B1 | 6/2016 | Shukla et al. |
| 9,428,042 B2 | 8/2016 | Morrow et al. |
| 9,452,750 B2 | 9/2016 | Shukla et al. |
| 9,492,695 B2 | 11/2016 | Betz et al. |
| 9,504,863 B2 | 11/2016 | Moore |
| 9,579,530 B2 | 2/2017 | Betz et al. |
| 9,580,962 B2 | 2/2017 | Betz et al. |
| 9,650,032 B2 * | 5/2017 | Kotloski ............... F16H 3/728 |
| 9,651,120 B2 | 5/2017 | Morrow et al. |
| 9,656,659 B2 | 5/2017 | Shukla et al. |
| 9,677,334 B2 | 6/2017 | Aiken et al. |
| 9,821,789 B2 | 11/2017 | Shukla et al. |
| 9,908,520 B2 | 3/2018 | Shukla et al. |
| 9,970,515 B2 | 5/2018 | Morrow et al. |
| 10,029,555 B2 | 7/2018 | Kotloski et al. |
| 2002/0005304 A1 | 1/2002 | Bachman et al. |
| 2002/0045507 A1 | 4/2002 | Bowen |
| 2002/0065594 A1 | 5/2002 | Squires et al. |
| 2003/0130765 A1 | 7/2003 | Pillar et al. |
| 2003/0158635 A1 | 8/2003 | Pillar et al. |
| 2003/0163228 A1 | 8/2003 | Pillar et al. |
| 2003/0163230 A1 | 8/2003 | Pillar et al. |
| 2003/0166429 A1 | 9/2003 | Tumback |
| 2003/0171854 A1 | 9/2003 | Pillar et al. |
| 2003/0195680 A1 | 10/2003 | Pillar |
| 2003/0200015 A1 | 10/2003 | Pillar |
| 2003/0230443 A1 | 12/2003 | Cramer et al. |

(56) References Cited

U.S. PATENT DOCUMENTS

| | | |
|---|---|---|
| 2004/0019414 A1 | 1/2004 | Pillar et al. |
| 2004/0024502 A1 | 2/2004 | Squires et al. |
| 2004/0039510 A1 | 2/2004 | Archer et al. |
| 2004/0040775 A1 | 3/2004 | Shimizu et al. |
| 2004/0055802 A1 | 3/2004 | Pillar et al. |
| 2004/0069865 A1 | 4/2004 | Rowe et al. |
| 2004/0133319 A1 | 7/2004 | Pillar et al. |
| 2004/0133332 A1 | 7/2004 | Yakes et al. |
| 2004/0198551 A1 | 10/2004 | Joe et al. |
| 2004/0199302 A1 | 10/2004 | Pillar et al. |
| 2004/0251862 A1 | 12/2004 | Imai |
| 2005/0004733 A1 | 1/2005 | Pillar et al. |
| 2005/0038934 A1 | 2/2005 | Gotze et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0131600 A1 | 6/2005 | Quigley et al. |
| 2005/0137042 A1 | 6/2005 | Schmidt et al. |
| 2005/0209747 A1 | 9/2005 | Yakes et al. |
| 2005/0234622 A1 | 10/2005 | Pillar et al. |
| 2005/0252703 A1 | 11/2005 | Schmidt et al. |
| 2006/0111213 A1 | 5/2006 | Bucknor et al. |
| 2006/0128513 A1 | 6/2006 | Tata et al. |
| 2006/0223663 A1 | 10/2006 | Bucknor et al. |
| 2006/0276288 A1 | 12/2006 | Iwanaka et al. |
| 2006/0289212 A1 | 12/2006 | Haruhisa |
| 2007/0021256 A1 | 1/2007 | Klemen et al. |
| 2007/0105678 A1 | 5/2007 | Bucknor et al. |
| 2007/0243966 A1 | 10/2007 | Holmes et al. |
| 2007/0254761 A1 | 11/2007 | Kim |
| 2007/0256870 A1 | 11/2007 | Holmes et al. |
| 2007/0275808 A1 | 11/2007 | Iwanaka et al. |
| 2008/0150350 A1 | 6/2008 | Morrow et al. |
| 2008/0200296 A1 | 8/2008 | Holmes |
| 2008/0234087 A1 | 9/2008 | Besnard et al. |
| 2008/0269000 A1 | 10/2008 | Abe et al. |
| 2008/0280726 A1 | 11/2008 | Holmes et al. |
| 2009/0054202 A1 | 2/2009 | Yamakado et al. |
| 2009/0194347 A1 | 8/2009 | Morrow et al. |
| 2009/0209381 A1 | 8/2009 | Ai et al. |
| 2009/0221390 A1 | 9/2009 | Houle |
| 2009/0227409 A1 | 9/2009 | Ito et al. |
| 2009/0227417 A1 | 9/2009 | Imamura et al. |
| 2009/0275437 A1* | 11/2009 | Kersting ............... B60K 6/365 475/5 |
| 2010/0029428 A1 | 2/2010 | Abe et al. |
| 2010/0051361 A1 | 3/2010 | Katsuta et al. |
| 2010/0051367 A1 | 3/2010 | Yamada et al. |
| 2010/0070008 A1 | 3/2010 | Parker et al. |
| 2010/0120579 A1 | 5/2010 | Kawasaki |
| 2010/0121512 A1 | 5/2010 | Takahashi et al. |
| 2010/0138086 A1 | 6/2010 | Imamura et al. |
| 2010/0145589 A1 | 6/2010 | Kobayashi |
| 2010/0179009 A1 | 7/2010 | Wittkopp et al. |
| 2010/0227722 A1 | 9/2010 | Conlon |
| 2010/0261565 A1 | 10/2010 | Ai et al. |
| 2010/0301668 A1 | 12/2010 | Yakes et al. |
| 2010/0312423 A1 | 12/2010 | Steinhauser et al. |
| 2010/0326752 A1 | 12/2010 | Lamperth |
| 2011/0127095 A1 | 6/2011 | Imamura et al. |
| 2011/0130234 A1 | 6/2011 | Phillips |
| 2011/0143875 A1 | 6/2011 | Ono et al. |
| 2011/0312459 A1 | 12/2011 | Morrow et al. |
| 2011/0319211 A1 | 12/2011 | Si |
| 2012/0022737 A1 | 1/2012 | Kumazaki et al. |
| 2012/0226401 A1 | 9/2012 | Naito |
| 2013/0090202 A1 | 4/2013 | Hiraiwa |
| 2013/0151131 A1 | 6/2013 | Laszio et al. |
| 2013/0196806 A1 | 8/2013 | Morrow et al. |
| 2013/0260936 A1 | 10/2013 | Takei et al. |
| 2013/0296108 A1 | 11/2013 | Ortmann et al. |
| 2014/0094334 A1 | 4/2014 | Tamai et al. |
| 2014/0136035 A1 | 5/2014 | Boskovitch et al. |
| 2014/0141915 A1 | 5/2014 | Naqi et al. |
| 2014/0228168 A1 | 8/2014 | Kaufman et al. |
| 2014/0229043 A1 | 8/2014 | Frank et al. |
| 2014/0235394 A1 | 8/2014 | Smetana et al. |
| 2014/0243149 A1 | 8/2014 | Holmes et al. |
| 2014/0269145 A1 | 9/2014 | Fasana et al. |
| 2014/0288756 A1 | 9/2014 | Tanaka et al. |
| 2014/0303822 A1 | 10/2014 | Kawamura et al. |
| 2014/0335995 A1 | 11/2014 | Swales et al. |
| 2014/0350803 A1 | 11/2014 | Ye et al. |
| 2014/0357441 A1 | 12/2014 | Supina |
| 2014/0358340 A1 | 12/2014 | Radev |
| 2015/0024894 A1 | 1/2015 | Lee et al. |
| 2015/0246331 A1 | 9/2015 | Broker et al. |
| 2015/0283894 A1 | 10/2015 | Morrow et al. |
| 2015/0292600 A1* | 10/2015 | Ai .................... B60W 10/11 475/5 |
| 2015/0377327 A1 | 12/2015 | Lee et al. |
| 2016/0133557 A1 | 5/2016 | Mortensen et al. |
| 2016/0288780 A1 | 10/2016 | Shukla et al. |
| 2016/0311253 A1 | 10/2016 | Palmer et al. |
| 2016/0361987 A1 | 12/2016 | Morrow et al. |
| 2017/0008507 A1 | 1/2017 | Shukla et al. |
| 2017/0108085 A1 | 4/2017 | Morrow et al. |
| 2017/0246946 A1 | 8/2017 | Morrow et al. |
| 2017/0246947 A1 | 8/2017 | Kotloski et al. |
| 2017/0253229 A1 | 9/2017 | Shukla et al. |
| 2017/0363180 A1 | 12/2017 | Steinberger et al. |
| 2017/0370446 A1 | 12/2017 | Steinberger et al. |
| 2018/0023671 A1 | 1/2018 | Watt et al. |
| 2018/0023672 A1 | 1/2018 | Watt et al. |
| 2018/0031085 A1 | 2/2018 | Steinberger et al. |
| 2018/0072303 A1 | 3/2018 | Shukla et al. |
| 2018/0162351 A1 | 6/2018 | Shukla et al. |
| 2018/0222484 A1 | 8/2018 | Shively et al. |
| 2018/0259042 A1 | 9/2018 | Morrow et al. |
| 2018/0326832 A1 | 11/2018 | Kotloski et al. |
| 2018/0345783 A1 | 12/2018 | Morrow et al. |
| 2019/0111910 A1 | 4/2019 | Shukla et al. |
| 2019/0178350 A1 | 6/2019 | Steinberger et al. |
| 2019/0217698 A1 | 7/2019 | Broker et al. |
| 2019/0242460 A1 | 8/2019 | Morrow et al. |

FOREIGN PATENT DOCUMENTS

| | | |
|---|---|---|
| CN | 101323243 A | 12/2008 |
| CN | 101356070 A | 1/2009 |
| CN | 101631688 A | 1/2010 |
| CN | 103158526 A | 6/2013 |
| CN | 104553731 A | 4/2015 |
| CN | 107405990 | 11/2017 |
| DE | 18 16 183 | 6/1970 |
| DE | 41 08 647 A1 | 9/1992 |
| DE | 41 34 160 A1 | 4/1993 |
| DE | 44 31 929 C1 | 10/1995 |
| DE | 19749074 A1 | 5/1999 |
| DE | 19851436 A1 | 5/2000 |
| DE | 10 2011 109 352 | 2/2013 |
| DE | 2011109352 A1 | 2/2013 |
| DE | 10 2013 006 028 A1 | 10/2014 |
| EP | 0 791 506 A2 | 8/1997 |
| EP | 0 622 264 B1 | 11/1998 |
| EP | 0 898 213 A1 | 2/1999 |
| EP | 0 925 981 A2 | 6/1999 |
| EP | 1 018 451 A1 | 7/2000 |
| EP | 0 805 059 B1 | 8/2000 |
| EP | 1 092 406 A2 | 4/2001 |
| EP | 0 564 943 B1 | 6/2001 |
| EP | 1 142 744 A1 | 10/2001 |
| EP | 0 812 720 B1 | 12/2001 |
| EP | 1 229 636 A2 | 8/2002 |
| EP | 1 340 643 A2 | 9/2003 |
| EP | 0 937 600 B1 | 12/2005 |
| FR | 2658259 A1 | 8/1991 |
| GB | 1 308 318 | 2/1973 |
| GB | 2 302 850 A | 2/1997 |
| GB | 2 346 124 A | 8/2000 |
| GB | 2 400 588 | 1/2005 |
| GB | 2 400 589 | 2/2005 |
| GB | 2 400 590 | 3/2005 |

(56) References Cited

FOREIGN PATENT DOCUMENTS

| | | | |
|---|---|---|---|
| JP | 60-216703 A | | 10/1985 |
| JP | 2010-070008 A | | 4/2010 |
| JP | 2013-112318 A1 | | 6/2013 |
| KR | 10-2010-0095073 A | | 8/2010 |
| WO | WO-98/19875 A1 | | 5/1998 |
| WO | WO-00/30235 A1 | | 5/2000 |
| WO | WO-01/54939 A2 | | 8/2001 |
| WO | WO-03/055714 A1 | | 7/2003 |
| WO | WO-03/093046 A2 | | 11/2003 |
| WO | WO-2004/083081 | | 9/2004 |
| WO | WO-2004/110849 | | 12/2004 |
| WO | WO-2006/028452 | | 3/2006 |
| WO | WO-2006/037041 | | 4/2006 |
| WO | WO-2006/037098 | | 4/2006 |
| WO | WO-2006/037099 | | 4/2006 |
| WO | WO-2007/108805 | | 9/2007 |
| WO | WO-2011/041549 | | 4/2011 |
| WO | WO-2011/163135 | | 12/2011 |
| WO | WO-2014/090483 A1 | | 6/2014 |
| WO | WO-2014-090486 A1 | | 6/2014 |
| WO | WO-2014/102030 A1 | | 7/2014 |
| WO | WO-2014/140096 A1 | | 9/2014 |
| WO | WO-2014/158078 A1 | | 10/2014 |
| WO | WO-2014/166723 A1 | | 10/2014 |
| WO | WO-2016/133557 | | 8/2016 |
| WO | WO-2016/172250 | | 10/2016 |
| WO | WO-2017/007599 | | 1/2017 |
| WO | WO-2017/007600 | | 1/2017 |
| WO | WO-2017/070388 | | 4/2017 |
| WO | WO-2017/106410 A1 | | 6/2017 |

OTHER PUBLICATIONS

U.S. Appl. No. 09/510,547, filed Feb. 22, 2000, Oshkosh Truck Corporation.
U.S. Appl. No. 14/552,240, filed Nov. 24, 2014, Oshkosh Corporation.
U.S. Appl. No. 14/552,252, filed Nov. 24, 2014, Oshkosh Corporation.
U.S. Appl. No. 14/552,275, filed Nov. 24, 2014, Oshkosh Corporation.
U.S. Appl. No. 14/552,283, filed Nov. 24, 2014, Oshkosh Corporation.
U.S. Appl. No. 14/552,293, filed Nov. 24, 2014, Oshkosh Corporation.
U.S. Appl. No. 14/624,285, filed Feb. 17, 2015, Oshkosh Corporation.
U.S. Appl. No. 14/693,479, filed Apr. 22, 2015, Oshkosh Corporation.
U.S. Appl. No. 14/792,532, filed Jul. 6, 2015, Oshkosh Corporation.
U.S. Appl. No. 14/792,535, filed Jul. 6, 2015, Oshkosh Corporation.
Bose, et al., "High Frequency AC vs. DC Distribution System for Next Generation Hybrid Electric Vehicle," Industrial Electronics, Control and Instrumentation, Proceedings of the 1996 IEEE IECON 22nd International Conference on Taipei, Taiwan, New York, New York, pp. 706-712 Aug. 5-10, 1996.
European Search Report based on European Application No. EP 0724300, date of completion of the search Jul. 4, 2005, 2 pages.
Dana Spicer Central Tire Inflation System Specifications, Dana Corporation, Kalamazoo, Michigan, 2 pages, May 2000.
Diesel Locomotive Technology, http://www.railway-technical.com/diesel.shtml, available by Jan. 24, 2012, 15 pages.
International Preliminary Report on Patentability on PCT/US2016/057971, dated Apr. 24, 2018, 8 pages.
International Search Report and Written Opinion on PCT/US2015/050518, dated Feb. 9, 2016, 18 pages.
International Search Report and Written Opinion on PCT/US2016/038586, dated Oct. 21, 2016, 14 pages.
International Search Report and Written Opinion on PCT/US2016/038587, dated Nov. 10, 2016, 15 pages.
International Search Report and Written Opinion on PCT/US2016/057971, dated Jan. 27, 2017, 11 pages.
International Search Report and Written Opinion on PCT/US2018/049158, dated Dec. 13, 2018, 18 pages.
International Search Report and Written Opinion on PCT/US2018/049550, dated Dec. 13 2018, 18 pages.
International Search Report and Written Opinion on PCT/US2018/053983, dated Jan. 3, 2019, 18 pages.
International Search Report and Written Opinion on PCT/US2019/017854, dated May 10, 2019, 17 pages.
International Search Report for PCT Application No. PCT/US2011/041089, dated Dec. 19, 2011, 6 pages.
Invitation to Pay Additional Fees regarding International Application No. PCT/US2011/041089, dated Sep. 6, 2011, 5 pages.
Khan, I.A., Automotive Electrical Systems: Architecture and Components, Digital Avionics Systems Conference, IEEE, pp. 8.C.5-1-8.C.5-10, 1999.
Miller, Hybrid Electric Vehicle Propulsion System Architectures of the e-CVT Type, IEEE Transactions on Power Electronics, vol. 21, No. 3, May 2006, 12 pages.
Namuduri, et al., High Power Density Electric Drive for an Hybrid Vehicle, Applied Power Electronics Conference and Exposition, pp. 34-40, Feb. 15, 1998.
Rajashekara, K., History of Electric Vehicles in General Motors, Industry Applications Society Annual Meeting, pp. 447-454, Oct. 2-8, 1993.
Shigley et al., Theory of Machines and Mechanisms, complete text, McGraw-Hill Book Company, published in the United States, 297 pages, 1980.
International Preliminary Report on Patentability on PCT/US2015/050518, dated Aug. 22, 2017, 11 pages.

\* cited by examiner

INLINE ELECTROMECHANICAL VARIABLE TRANSMISSION SYSTEM

CROSS-REFERENCE TO RELATED PATENT APPLICATION

This application is a continuation of U.S. patent application Ser. No. 14/918,221, filed Oct. 20, 2015, which is incorporated herein by reference in its entirety.

BACKGROUND

Internal combustion engine vehicles, hybrid vehicles, and electric vehicles, among other types of vehicles, include transmissions. Traditional vehicle transmissions use gears and gear trains to provide speed and torque conversions from a rotating power source (e.g., an engine, a motor, etc.) to another device (e.g., a drive shaft, wheels of a vehicle, etc.). Transmissions include multiple gear ratios selectively coupled to the rotating power source with a mechanism. The mechanism may also selectively couple an output to the various gear ratios.

SUMMARY

One exemplary embodiment relates to a drive system for a vehicle including a first gear set, a second gear set, a connecting shaft coupled to the first gear set, a first electrical machine coupled to the first gear set, a second electrical machine coupled to the second gear set, an output shaft configured to transport power from the first electrical machine and the second electrical machine to a tractive element of the vehicle, a first clutch selectively rotationally coupling the first gear set to the output shaft when engaged, and a second clutch selectively rotationally coupling the first gear set to the output shaft when engaged. The first gear set includes a first sun gear, a first ring gear, a first plurality of planetary gears coupling the first sun gear to the first ring gear, and a first carrier rotationally supporting the first plurality of planetary gears. The second gear set including a second sun gear, a second ring gear, a second plurality of planetary gears coupling the second sun gear to the second ring gear, and a second carrier rotationally supporting the second plurality of planetary gears. The first carrier is selectively coupled to the second carrier. The output shaft is aligned with the connecting shaft, the first electrical machine, and the second electrical machine to thereby form a straight-thru transmission arrangement. The first clutch is configured to be engaged when the drive system is selectively reconfigured into a forward mode of operation, and the second clutch is configured to be engaged when the drive system is selectively reconfigured into a reverse mode of operation.

Another exemplary embodiment relates to a drive system for a vehicle including a first planetary gear set, a second planetary gear set selectively coupled to the first planetary gear set, a connecting shaft directly coupled to the first planetary gear set, a first electromagnetic device directly coupled to the first planetary gear set, a second electromagnetic device directly coupled to the second planetary gear set and at least selectively rotationally coupled to the connecting shaft, an output aligned with the first planetary gear set, the second planetary gear set, and the connecting shaft to thereby form a straight-thru transmission arrangement, an auxiliary shaft radially offset from the connecting shaft and the output, and a clutch positioned to selectively rotationally couple the first planetary gear set to the auxiliary shaft when engaged. The auxiliary shaft is rotationally coupled to the output and the second planetary gear set.

Another exemplary embodiment relates to a vehicle including a multi-mode transmission, a connecting shaft, and a drive axle. The multi-mode transmission includes a first gear set and a second gear set, a first motor/generator coupled to the first gear set, a second motor/generator coupled to the second gear set, and an output shaft selectively coupled to the first gear set and the first motor/generator. The first gear set includes a planetary gear set having a planetary gear carrier. The planetary gear carrier and the second gear set are selectively rotatably coupled. The connecting shaft is directly coupled to the first gear set and selectively coupled to the second gear set. The drive axle is coupled to the output shaft of the multi-mode transmission.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a multi-mode inline electromechanical variable transmission is provided as part of a vehicle and is selectively reconfigurable between a plurality of operating modes. The vehicle may also include an engine and one or more tractive elements (e.g., wheel and tire assemblies, etc.). The multi-mode inline electromechanical variable transmission may include a first electromagnetic device and a second electromagnetic device. In one embodiment, at least one of the first electromagnetic device and the second electromagnetic device provides rotational mechanical energy to start the engine. In another embodiment, the engine provides a rotational mechanical energy input to both the first and second electromagnetic devices such that each operates as a generator to generate electrical energy. In still other embodiments, one of the first electromagnetic device and the second electromagnetic device are configured to receive a rotational mechanical energy output from the engine and provide an electrical energy output to power a control system and/or the other electromagnetic device. According to an exemplary embodiment, the multi-mode inline electromechanical variable transmission has a compact design that facilitates direct replacement of traditional inline transmissions (e.g., mechanical transmissions, transmissions without electromagnetic devices, etc.) used in front engine applications. Thus, the multi-mode inline electromechanical variable transmission may be installed during a new vehicle construction or installed to replace a conventional transmission of a front engine vehicle (e.g., as opposed to replacing a traditional midship transfer case, etc.).

Figure 1:
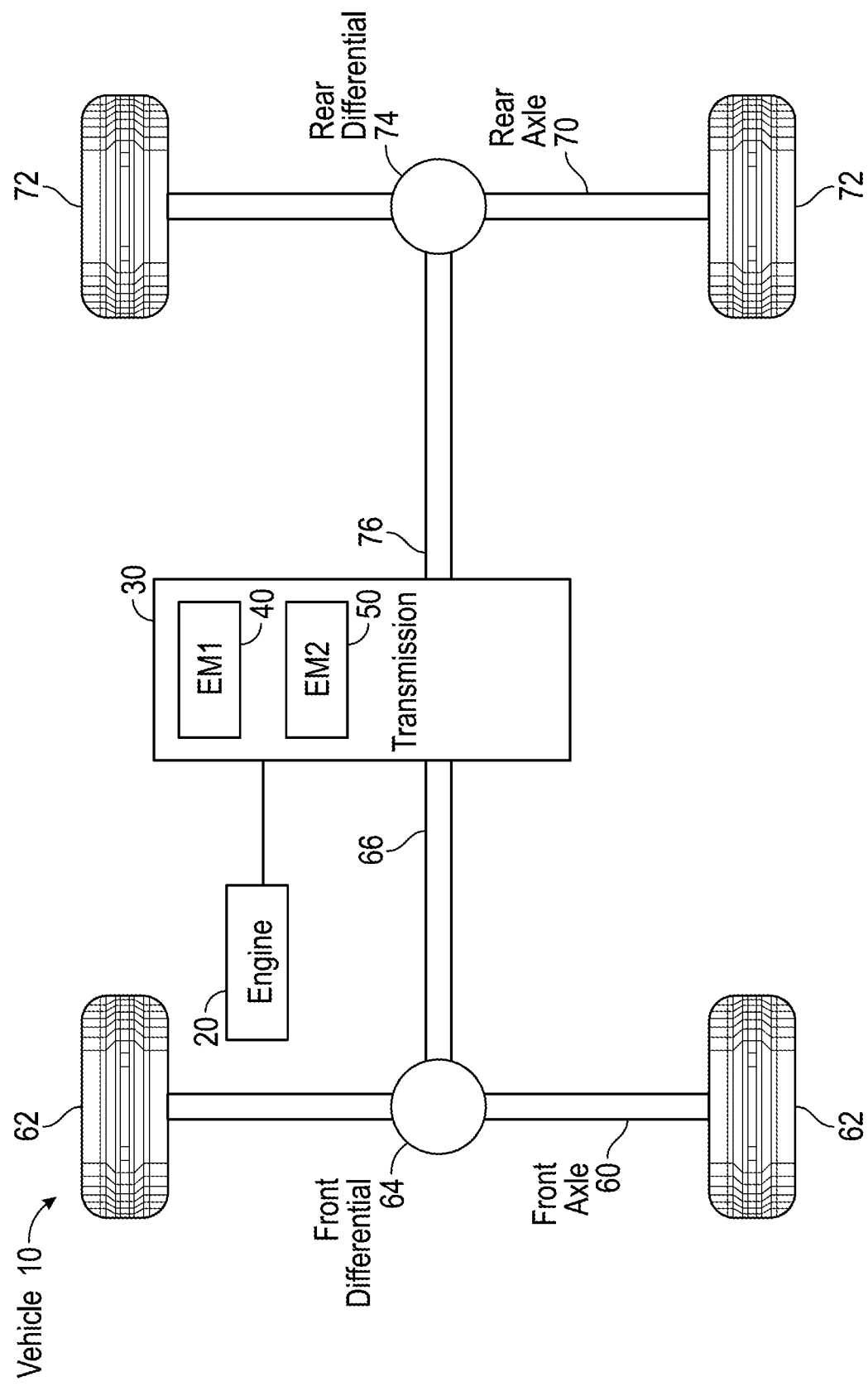
FIG. 1 is a schematic view of a vehicle having a drive train, according to an exemplary embodiment.
Figure 2:
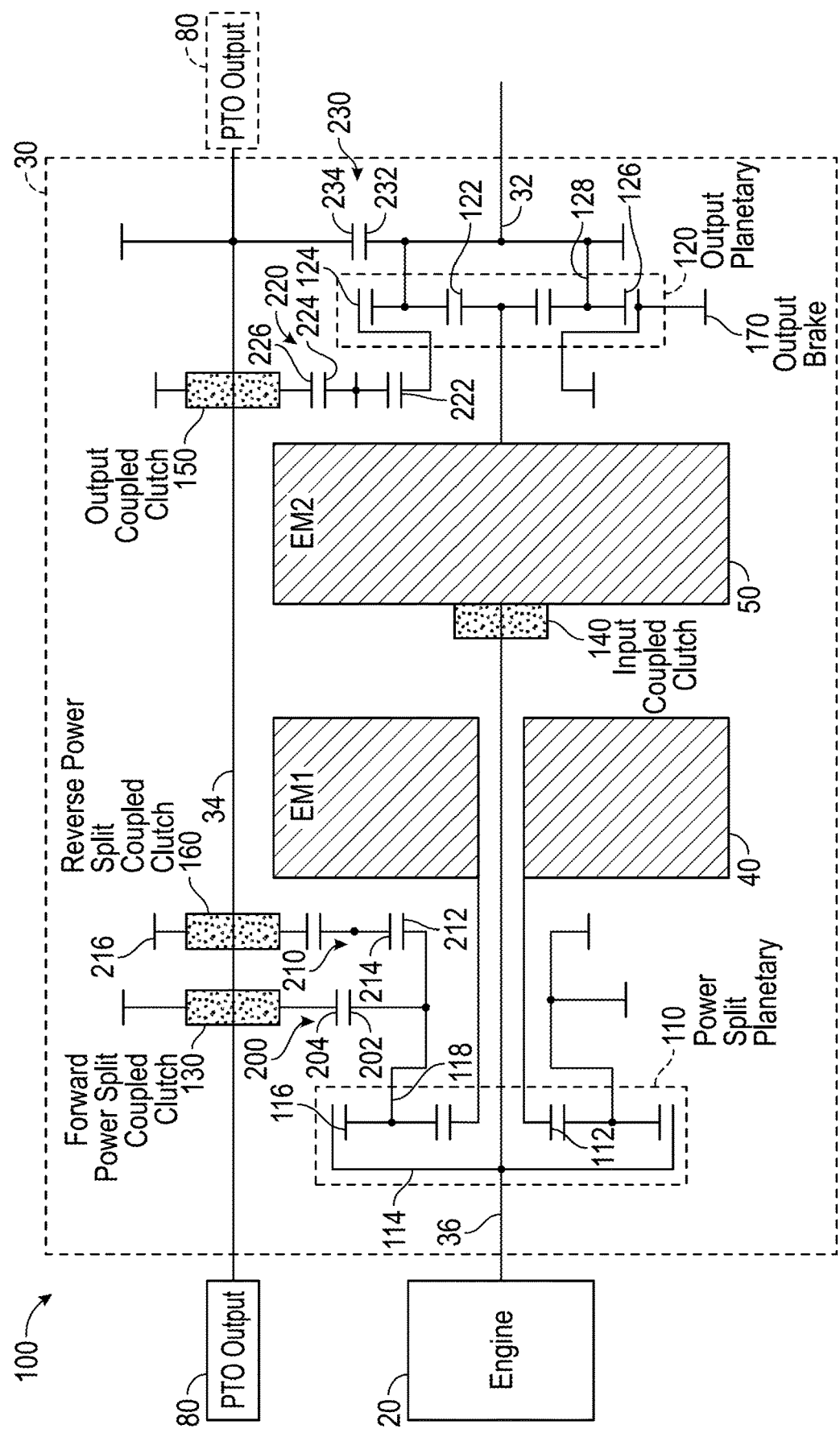
FIG. 2 is a detailed schematic view of the drive train of FIG. 1, according to an exemplary embodiment.

According to the exemplary embodiment shown in FIGS. 1-2, a vehicle 10 includes an engine 20 coupled to a transmission, shown as transmission 30. In one embodiment, engine 20 is configured to combust fuel and provide a mechanical energy input to transmission 30. By way of example, engine 20 may be configured to provide a rotational mechanical energy input to transmission 30. As shown in FIGS. 1-2, transmission 30 includes a first electrical machine, electromagnetic device and/or motor/generator, shown as first electromagnetic device 40, and a second electrical machine, electromagnetic device and/or motor/generator, shown as second electromagnetic device 50. According to an exemplary embodiment, vehicle 10 is configured as a front engine vehicle and transmission 30 is configured as a multi-mode inline electromechanical transmission. In other embodiments, vehicle 10 is configured as a mid-engine vehicle or a rear engine vehicle.

Referring again to the exemplary embodiment shown in FIG. 1, vehicle 10 includes a front axle, shown as front axle 60, and a rear axle, shown as rear axle 70. As shown in FIG. 1, front axle 60 includes a pair of tractive elements, shown as tires 62, coupled to a front differential, shown as front differential 64. Rear axle 70 includes a pair of tractive elements, shown as tires 72, coupled to a rear differential, shown as rear differential 74, according to an exemplary embodiment. According to the exemplary embodiment shown in FIG. 1, front differential 64 is coupled to transmission 30 with a front axle driveshaft 66, and rear differential 74 is coupled to transmission 30 with a rear axle driveshaft 76. While shown as coupled to tires 62 and tires 72, front differential 64 and rear differential 74 may be coupled to various other types of tractive elements (e.g., tracks, etc.), according to alternative embodiments. As shown in FIG. 1, front axle driveshaft 66 and rear axle driveshaft 76 are configured to transport power from first electromagnetic device 40, second electromagnetic device 50, and engine 20 to tires 62 and tires 72, respectively. Vehicle 10 may include a plurality of front differentials 64 that may be coupled and/or a plurality of rear differentials 74 that may be coupled, according to various alternative embodiments. In some embodiments, transmission 30 is selectively coupled (e.g., via a clutch mechanism, coupling mechanism, etc.) to at least one of the font axle driveshaft 66 and the rear axle driveshaft 76 (e.g., to reconfigure vehicle 10 into a front-wheel-drive configuration, a rear-wheel-drive configuration, an all-wheel-drive configuration, a four-wheel-drive configuration, etc.).

Engine 20 may be any source of rotational mechanical energy that is derived from a stored energy source. The stored energy source is disposed onboard vehicle 10, according to an exemplary embodiment. The stored energy source may include a liquid fuel or a gaseous fuel, among other alternatives. In one embodiment, engine 20 includes an internal combustion engine configured to be powered by at least one of gasoline, natural gas, and diesel fuel. According to various alternative embodiments, engine 20 includes at least one of a turbine, a fuel cell, and an electric motor, or still another device. According to one exemplary embodiment, engine 20 includes a twelve liter diesel engine capable of providing between approximately 400 horsepower and approximately 600 horsepower and between approximately 400 foot pounds of torque and approximately 2000 foot pounds of torque. In one embodiment, engine 20 has a rotational speed (e.g., a rotational operational range, etc.) of between 0 and 2,100 revolutions per minute. Engine 20 may be operated at a relatively constant speed (e.g., 1,600 revolutions per minute, etc.). In one embodiment, the relatively constant speed is selected based on an operating condition of engine 20 (e.g., an operating speed relating to a point of increased fuel efficiency, etc.).

In one embodiment, at least one of first electromagnetic device 40 and second electromagnetic device 50 provide a mechanical energy input to another portion of transmission 30. By way of example, at least one of first electromagnetic device 40 and second electromagnetic device 50 may be configured to provide a rotational mechanical energy input to another portion of transmission 30 (i.e., at least one of first electromagnetic device 40 and second electromagnetic device 50 may operate as a motor, etc.). At least one of first electromagnetic device 40 and second electromagnetic device 50 may receive a mechanical energy output from at least one of engine 20 and another portion of transmission 30. By way of example, at least one of first electromagnetic device 40 and second electromagnetic device 50 may be configured to receive a rotational mechanical energy output from at least one of engine 20 and another portion of transmission 30 and provide an electrical energy output (i.e., at least one of first electromagnetic device 40 and second electromagnetic device 50 may operate as a generator, etc.). According to an exemplary embodiment, first electromagnetic device 40 and second electromagnetic device 50 are capable of both providing mechanical energy and converting a mechanical energy input into an electrical energy output (i.e., selectively operate as a motor and a generator, etc.). The operational condition of first electromagnetic device 40 and second electromagnetic device 50 (e.g., as a motor, as a generator, etc.) may vary based on a mode of operation associated with transmission 30.

According to the exemplary embodiment shown in FIG. 2, a drive system for a vehicle, shown as drive system 100, includes engine 20 and transmission 30 having first electromagnetic device 40, and second electromagnetic device 50. As shown in FIG. 2, transmission 30 includes a first gear set, shown as power split planetary 110, and a second gear set, shown as output planetary 120. In one embodiment, power split planetary 110 and output planetary 120 are positioned outside of (e.g., on either side of, sandwiching, not between, etc.) first electromagnetic device 40 and second electromagnetic device 50. In an alternative embodiment, one or both of power split planetary 110 and output planetary 120 are disposed between first electromagnetic device 40 and second electromagnetic device 50.

Referring to the exemplary embodiment shown in FIG. 2, power split planetary 110 is a planetary gear set that includes a sun gear 112, a ring gear 114, and a plurality of planetary gears 116. The plurality of planetary gears 116 couple sun gear 112 to ring gear 114, according to an exemplary embodiment. As shown in FIG. 2, a carrier 118 rotationally supports the plurality of planetary gears 116. In one embodiment, first electromagnetic device 40 is directly coupled to sun gear 112 such that power split planetary 110 is coupled to first electromagnetic device 40. By way of example, first electromagnetic device 40 may include or be coupled to a shaft (e.g., a first shaft, an input shaft, an output shaft, etc.) directly coupled to sun gear 112. As shown in FIG. 2, transmission 30 includes a shaft, shown as connecting shaft 36. According to an exemplary embodiment, connecting shaft 36 directly couples engine 20 to power split planetary 110. In one embodiment, connecting shaft 36 directly couples engine 20 with ring gear 114 of power split planetary 110. According to an exemplary embodiment, power split planetary 110 is at least one of directly coupled to and directly powers a power takeoff ("PTO") (e.g., a live PTO, etc.). By way of example, ring gear 114 of power split planetary 110 may be at least one of directly coupled to and directly power the PTO.

Referring still to the exemplary embodiment shown in FIG. 2, output planetary 120 is a planetary gear set that includes a sun gear 122, a ring gear 124, and a plurality of planetary gears 126. The plurality of planetary gears 126 couple sun gear 122 to ring gear 124, according to an exemplary embodiment. As shown in FIG. 2, a carrier 128 rotationally supports the plurality of planetary gears 126. In one embodiment, second electromagnetic device 50 is directly coupled to sun gear 122 such that output planetary 120 is coupled to second electromagnetic device 50. By way of example, second electromagnetic device 50 may include or be coupled to a shaft (e.g., a second shaft, an input shaft, an output shaft, etc.) directly coupled to sun gear 122. Carrier 128 is directly rotationally coupled to an output with a shaft, shown as output shaft 32, according to the exemplary embodiment shown in FIG. 2. Output shaft 32 may be coupled to at least one of rear axle driveshaft 76 and front axle driveshaft 66. By way of example, output shaft 32 may be coupled to rear axle driveshaft 76 where transmission 30 is installed in place of a traditional, mechanical, straight-thru transmission. In another embodiment, the output is a PTO output, and output shaft 32 is coupled thereto. A clutch assembly may be engaged and disengaged to selectively couple at least one of front axle driveshaft 66 and rear axle driveshaft 76 to output shaft 32 of transmission 30 (e.g., to facilitate operation of a vehicle in a rear-wheel-drive mode, an all-wheel-drive mode, a four-wheel-drive mode, a front-wheel-drive mode, etc.).

According to an exemplary embodiment, transmission 30 includes a first clutch, shown as forward power split coupled clutch 130. Forward power split coupled clutch 130 reduces or eliminates the risk of locking up the transmission 30, according to an exemplary embodiment. In one embodiment, forward power split coupled clutch 130 is positioned downstream of power split planetary 110 (e.g., along a power flow path between power split planetary 110 and output shaft 32, etc.). As shown in FIG. 2, forward power split coupled clutch 130 is positioned to selectively couple power split planetary 110 with an auxiliary shaft, shown as jack shaft 34. In one embodiment, forward power split coupled clutch 130 facilitates towing the vehicle without spinning at least some of the gears within transmission 30 (e.g., power split planetary 110, etc.). Power split planetary 110 is coupled to output shaft 32 when forward power split coupled clutch 130 is engaged (i.e., forward power split coupled clutch 130 rotationally couples carrier 118 to output shaft 32, etc.). According to an exemplary embodiment, forward power split coupled clutch 130 is engaged during a forward driving mode of drive system 100.

According to an exemplary embodiment, transmission 30 includes a second clutch, shown as reverse power split coupled clutch 160. In one embodiment, reverse power split coupled clutch 160 is positioned downstream of power split planetary 110 (e.g., along a power flow path between power split planetary 110 and output shaft 32, etc.). As shown in FIG. 2, reverse power split coupled clutch 160 is positioned to selectively couple power split planetary 110 with jack shaft 34. In one embodiment, reverse power split coupled clutch 160 facilitates towing the vehicle without spinning at least some of the gears within transmission 30 (e.g., power split planetary 110, etc.). Power split planetary 110 is coupled to output shaft 32 when reverse power split coupled clutch 160 is engaged (i.e., reverse power split coupled clutch 160 rotationally couples carrier 118 to output shaft 32, etc.). According to an exemplary embodiment, reverse power split coupled clutch 160 is engaged during a reverse driving mode of drive system 100. Forward power split coupled clutch 130 and reverse power split coupled clutch 160 may be separately engaged (e.g., not simultaneously, one is engaged and the other is not, etc.). According to the exemplary embodiment shown in FIG. 2, carrier 118 may be selectively coupled to carrier 128 (e.g., when either forward power split coupled clutch 130 or reverse power split coupled clutch 160 is engaged, etc.).

As shown in FIG. 2, transmission 30 includes a third clutch, shown as input coupled clutch 140. Input coupled clutch 140 is positioned to selectively couple second electromagnetic device 50 with engine 20 (e.g., through ring gear 114, etc.), according to an exemplary embodiment. Input coupled clutch 140 may thereby selectively couple engine 20 to output planetary 120 when engaged. According to an exemplary embodiment, connecting shaft 36 extends from engine 20, through first electromagnetic device 40, to input coupled clutch 140. Input coupled clutch 140 may selectively couple second electromagnetic device 50 with connecting shaft 36. According to an exemplary embodiment, first electromagnetic device 40 and second electromagnetic device 50 (e.g., input/output shafts thereof, etc.) are aligned (e.g., radially aligned, etc.) with power split planetary 110, output planetary 120, connecting shaft 36, and/or output shaft 32 (e.g., centerlines thereof are aligned, to thereby form a straight-thru or inline transmission arrangement, etc.). As shown in FIG. 2, transmission 30 includes a fourth clutch, shown as output coupled clutch 150. Output coupled clutch 150 is positioned to selectively couple ring gear 124 of output planetary 120 with jack shaft 34, according to an exemplary embodiment.

As shown in FIG. 2, jack shaft 34 is radially offset from connecting shaft 36 and output shaft 32 (e.g., radially offset from centerlines thereof, etc.). Jack shaft 34 is rotationally coupled to carrier 128 of output planetary 120 and to output shaft 32. In some embodiments, jack shaft 34 is rotationally coupled (e.g., selectively rotationally coupled, etc.) to one or more outputs, shown as PTO outputs 80 (e.g., to drive one or more hydraulic pumps, to power one or more hydraulic systems, to power one or more electrical power generation systems, to power one or more pneumatic systems, etc.). In other embodiments, the one or more outputs are used to power (e.g., drive, etc.) a vehicle with which transmission 30 is associated. According to the exemplary embodiment shown in FIG. 2, forward power split coupled clutch 130 or reverse power split coupled clutch 160 rotationally couples carrier 118 of power split planetary 110 to jack shaft 34, and output coupled clutch 150 rotationally couples ring gear 124 of output planetary 120 to jack shaft 34.

Referring again to the exemplary embodiment shown in FIG. 2, transmission 30 includes brake, shown as output brake 170. Output brake 170 is positioned to selectively inhibit the movement of at least a portion of output planetary 120 (e.g., ring gear 124, etc.), according to an exemplary embodiment. In one embodiment, output brake 170 is biased into an engaged or braking position (e.g., with a spring, etc.) and selectively disengaged (e.g., with application of pressurized hydraulic fluid, etc.). In other embodiments, output brake 170 is hydraulically-biased and spring released. In still other embodiments, the components of transmission 30 are still otherwise engaged and disengaged (e.g., pneumatically, etc.). By way of example, output brake 170 and output coupled clutch 150 may be engaged simultaneously, providing a driveline brake such that rotational movement of at least one of output planetary 120 (e.g., ring gear 124, etc.), power split planetary 110 (e.g., carrier 118, etc.), jack shaft 34, and output shaft 32 are selectively limited.

As shown in FIG. 2, transmission 30 includes a gear set 200 that couples power split planetary 110 (e.g., carrier 118, etc.) to jack shaft 34. In one embodiment, gear set 200 includes a first gear, shown as gear 202, in meshing engagement with a second gear, shown as gear 204. As shown in FIG. 2, gear 202 is rotatably coupled to carrier 118. By way of example, gear 202 may be fixed to a component (e.g., shaft, tube, etc.) that is coupled to carrier 118. As shown in FIG. 2, forward power split coupled clutch 130 is positioned to selectively couple gear 204 with jack shaft 34 when engaged. With forward power split coupled clutch 130 disengaged, relative movement (e.g., rotation, etc.) occurs between gear 204 and jack shaft 34.

According to an exemplary embodiment, transmission 30 includes a gear set, shown as gear set 210, that couples power split planetary 110 to jack shaft 34. As shown in FIG. 2, gear set 210 includes a first gear, shown as gear 212, coupled to carrier 118 of power split planetary 110. Gear 212 is in meshing engagement with a second gear, shown as gear 214, according to an exemplary embodiment. As shown in FIG. 2, gear 214 is coupled to a third gear, shown as gear 216. Gear 214 may reverse the rotation direction of an output provided by gear 212 (e.g., gear 214 may facilitate rotating jack shaft 34 in a direction opposite that of gear 212 and carrier 118, etc.). In other embodiments, gear 212 is directly coupled to gear 216 (e.g., gear set 200 may include three gears, etc.). By way of example, gear set 210 may not include gear 214, and gear 212 may be directly coupled to (e.g., in meshing engagement with, etc.) gear 216. As shown in FIG. 2, reverse power split coupled clutch 160 is positioned to selectively couple gear 216 with jack shaft 34 when engaged. With reverse power split coupled clutch 160 disengaged, relative movement (e.g., rotation, etc.) occurs between gear 216 and jack shaft 34. According to an exemplary embodiment, the three gear arrangement of gear set 210 (e.g., gears 212-216, etc.) facilitates rotating jack shaft 34 in an opposite direction relative to the two gear arrangement of gear set 200 (e.g., gear 202 and gear 204, etc.). Engaging reverse power split coupled clutch 160 facilitates operating drive system 100 in a first direction (e.g., causing a vehicle to move in a reverse direction, etc.), while engaging forward power split coupled clutch 130 facilitates operating drive system 100 in an opposing direction (e.g., causing a vehicle to move in a forward direction, etc.).

Traditionally, operating a transmission in a reverse mode provides a limited amount of torque, speed, and/or power due to a subtraction effect (e.g., particularly at higher engine speeds, etc.) caused by components rotating in opposing directions (e.g., an engine rotating in a first direction and an electromagnetic device rotating in a second, opposing direction to cause reverse movement where the opposing rotations reduce and/or limit the output speed, etc.). According to an exemplary embodiment, at least one of power split planetary 110, gear set 210, and reverse power split coupled clutch 160 facilitates maintaining substantially equal power to output shaft 32 in both forward and reverse gears. At least one of power split planetary 110, gear set 210, and reverse power split coupled clutch 160 may reduce or eliminate a torque, speed, and/or power subtraction associated with traditional transmissions 30. At least one of power split planetary 110, gear set 210, and reverse power split coupled clutch 160 may facilitate providing a reverse driving torque to output shaft 32 while maintaining substantially the same torque, speed, and/or power in a reverse driving direction as in a forward driving direction (e.g., due to the forward power split coupled clutch 130 and the reverse power split coupled clutch 160 facilitating driving the vehicle in the forward and reverse modes separately while maintaining the direction of rotation of carrier 118, etc.).

According to an exemplary embodiment, transmission 30 includes a gear set, shown as gear set 220, that couples output planetary 120 to jack shaft 34. As shown in FIG. 2, gear set 220 includes a first gear, shown as gear 222, coupled to ring gear 124 of output planetary 120. Gear 222 is in meshing engagement with a second gear, shown as gear 224, according to an exemplary embodiment. As shown in FIG. 2, gear 224 is coupled to a third gear, shown as gear 226. In other embodiments, gear 222 is directly coupled with gear 226. By way of example, gear set 220 may not include gear 224, and gear 222 may be directly coupled to (e.g., in meshing engagement with, etc.) gear 226. As shown in FIG. 2, output coupled clutch 150 is positioned to selectively couple gear 226 with jack shaft 34 when engaged. With output coupled clutch 150 disengaged, relative movement (e.g., rotation, etc.) occurs between gear 226 and jack shaft 34. By way of example, output coupled clutch 150 may be engaged to couple ring gear 124 to jack shaft 34. Output brake 170 is positioned to selectively limit the movement of ring gear 124 when engaged to thereby also limit the movement of gear 222, gear 224, and gear 226, as well as jack shaft 34 when output coupled clutch 150 is engaged.

According to an exemplary embodiment, transmission 30 includes a gear set, shown as gear set 230, that couples output planetary 120 and output shaft 32 to jack shaft 34. As shown in FIG. 2, gear set 230 includes a first gear, shown as gear 232, coupled to output shaft 32 and carrier 128 of output planetary 120. In some embodiments, carrier 128 is not directly coupled to carrier 118. Carrier 128 is indirectly coupled to carrier 118, according to an exemplary embodiment (e.g., through gear set 220, jackshaft 34, output coupled clutch 150, at least one of forward power split coupled clutch 130 and reverse power split coupled clutch 160, and at least one of gear set 200 and gear set 210, etc.). Gear 232 is in meshing engagement with a second gear, shown as gear 234, according to an exemplary embodiment. As shown in FIG. 2, gear 234 is directly coupled to jack shaft 34.

Figure 3:
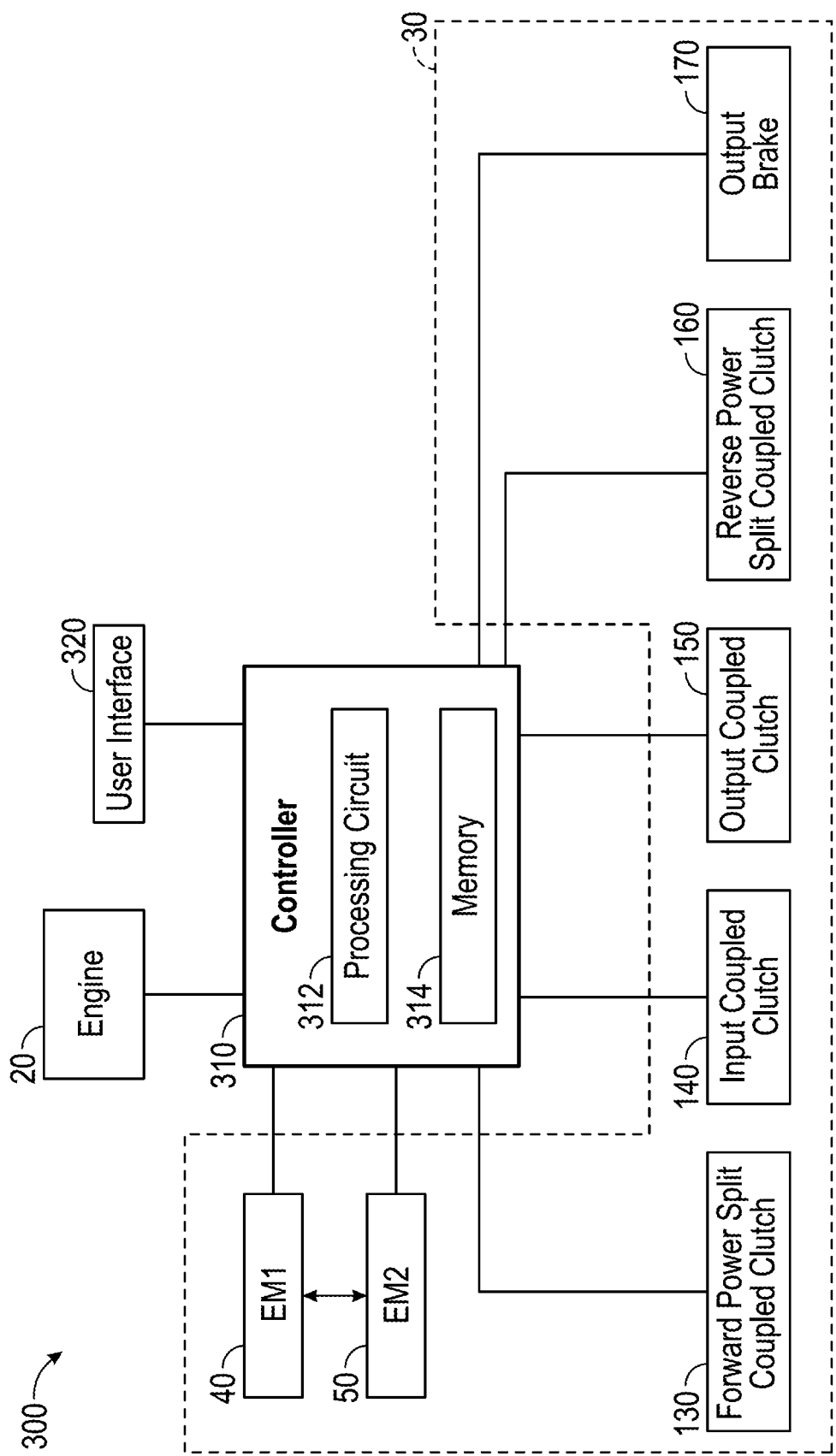
FIG. 3 is a schematic diagram of a control system for the drive train of FIG. 1, according to an exemplary embodiment.

According to the exemplary embodiment shown in FIG. 3, a control system 300 for a vehicle (e.g., vehicle 10, etc.) includes a controller 310. In one embodiment, controller 310 is configured to selectively engage, selectively disengage, or otherwise communicate with components of the vehicle according to various modes of operation. As shown in FIG. 3, controller 310 is coupled to engine 20. In one embodiment, controller 310 is configured to selectively engage engine 20 (e.g., interface with a throttle thereof, etc.) such that an output of engine 20 rotates at a target rate. Controller 310 is coupled to first electromagnetic device 40 and second electromagnetic device 50, according to an exemplary embodiment, and may send and receive signals therewith. By way of example, controller 310 may send command signals relating to at least one of a target mode of operation, a target rotational speed, and a target rotation direction for first electromagnetic device 40 and second electromagnetic device 50. As shown in FIG. 3, first electromagnetic device 40 and second electromagnetic device 50 are electrically coupled (e.g., by an electrical power transmission system, etc.). By way of example, power generated by first electromagnetic device 40 may be utilized by second electromagnetic device 50 (e.g., to provide an output torque as a motor, etc.), or power generated by second electromagnetic device 50 may be utilized by first electromagnetic device 40 (e.g., to provide an output torque as a motor, etc.).

According to an exemplary embodiment, the drive system 100 may include an energy storage device (e.g., a battery, etc.). In such embodiments, the battery may be charged and recharged by an electromagnetic device that is generating power. The battery may supply the electromagnetic device that is motoring the vehicle to propel the vehicle. In some embodiments, the battery may always be utilized as part of the drive system 100. In other embodiments, the battery may be used only when excess generated power must be stored or excess power is required to motor the vehicle.

According to alternative embodiments, drive system 100 may be configured to operate with first electromagnetic device 40 and second electromagnetic device 50, and no additional sources of electrical power. Additional sources of electrical power include, for example, a battery and other energy storage devices. Without an energy storage device, first electromagnetic device 40 and second electromagnetic device 50 may operate in power balance. One of the electromagnetic devices may provide all of the electrical power required by the other electromagnetic device (as well as the electrical power required to offset power losses). First electromagnetic device 40 and second electromagnetic device 50 may operate without doing either of (a) providing electrical power to an energy storage device or (b) consuming electrical power from an energy storage device. Thus, the sum of the electrical power produced or consumed by first electromagnetic device 40, the electrical power produced or consumed by second electromagnetic device 50, and electrical power losses may be zero. According to the embodiment of FIGS. 1-3, two electromagnetic devices are shown. In other embodiments, the system includes three or more electromagnetic devices.

According to the exemplary embodiment shown in FIG. 3, control system 300 includes a user interface 320 that is coupled to controller 310. In one embodiment, user interface 320 includes a display and an operator input. The display may be configured to display a graphical user interface, an image, an icon, or still other information. In one embodiment, the display includes a graphical user interface configured to provide general information about the vehicle (e.g., vehicle speed, fuel level, warning lights, etc.). The graphical user interface may be configured to also display a current mode of operation, various potential modes of operation, or still other information relating to transmission 30 and/or drive system 100. By way of example, the graphical user interface may be configured to provide specific information regarding the operation of drive system 100 (e.g., whether forward power split coupled clutch 130, input coupled clutch 140, output coupled clutch 150, reverse power split coupled clutch 160, and/or output brake 170 are engaged or disengaged, a fault condition where at least one of forward power split coupled clutch 130, input coupled clutch 140, output coupled clutch 150, reverse power split coupled clutch 160, and/or output brake 170 fail to engage or disengage in response to a command signal, etc.).

The operator input may be used by an operator to provide commands to at least one of engine 20, transmission 30, first electromagnetic device 40, second electromagnetic device 50, and drive system 100 or still another component of the vehicle. The operator input may include one or more buttons, knobs, touchscreens, switches, levers, or handles. In one embodiment, an operator may press a button to change the mode of operation for at least one of transmission 30, and drive system 100, and the vehicle. The operator may be able to manually control some or all aspects of the operation of transmission 30 using the display and the operator input. It should be understood that any type of display or input controls may be implemented with the systems and methods described herein.

Controller 310 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 3, controller 310 includes a processing circuit 312 and a memory 314. Processing circuit 312 may include an ASIC, one or more FPGAs, a DSP, circuits containing one or more processing components, circuitry for supporting a microprocessor, a group of processing components, or other suitable electronic processing components. In some embodiments, processing circuit 312 is configured to execute computer code stored in memory 314 to facilitate the activities described herein. Memory 314 may be any volatile or non-volatile computer-readable storage medium capable of storing data or computer code relating to the activities described herein. According to an exemplary embodiment, memory 314 includes computer code modules (e.g., executable code, object code, source code, script code, machine code, etc.) configured for execution by processing circuit 312. Memory 314 includes various actuation profiles corresponding to modes of operation (e.g., for transmission 30, for drive system 100, for a vehicle, etc.), according to an exemplary embodiment. In some embodiments, controller 310 may represent a collection of processing devices (e.g., servers, data centers, etc.). In such cases, processing circuit 312 represents the collective processors of the devices, and memory 314 represents the collective storage devices of the devices.

Referring next to the exemplary embodiments shown in FIGS. 4-11, transmission 30 is configured to operate according to a plurality of modes of operation. Various modes of operation for transmission 30 are identified below in Table 1. In other embodiments, a vehicle having transmission 30 is configured to operate according to the various modes of operation shown in FIGS. 4-11 and identified below in Table 1.

TABLE 1

| Mode of Operation | Forward Power Split Coupled Clutch 130 | Reverse Power Split Coupled Clutch 160 | Output Coupled Clutch 150 | Output Brake 170 | Input Coupled Clutch 140 |
|---|---|---|---|---|---|
| High Range Reverse | | X | | | X |
| Mid Range Reverse | | X | | X | |
| Low Range Reverse | | X | X | | |
| Neutral/ Vehicle Start | X (OR 160) | X (OR 130) | X | X | |
| Low Range Forward | X | | X | | |
| Mid Range Forward | X | | | X | |
| High Range Forward | X | | | | X |

As shown in Table 1, an "X" represents a component of drive system 100 (e.g., output brake 170, forward power split coupled clutch 130, etc.) that is engaged or closed during the respective modes of operation.

Figure 4:
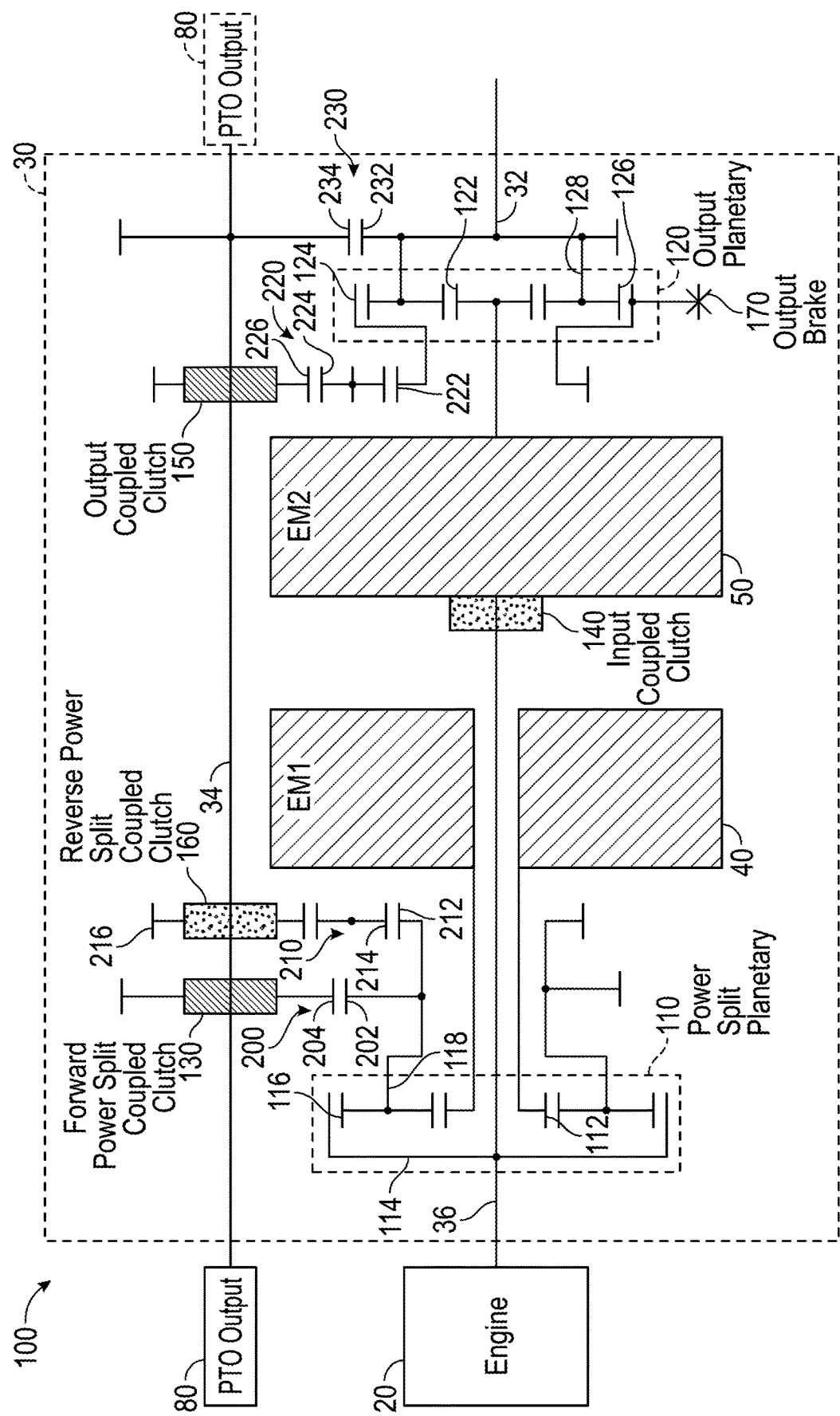
FIG. 4 is a detailed schematic view of a drive train configured in a neutral/startup mode of operation, according to an exemplary embodiment.
Figure 5:
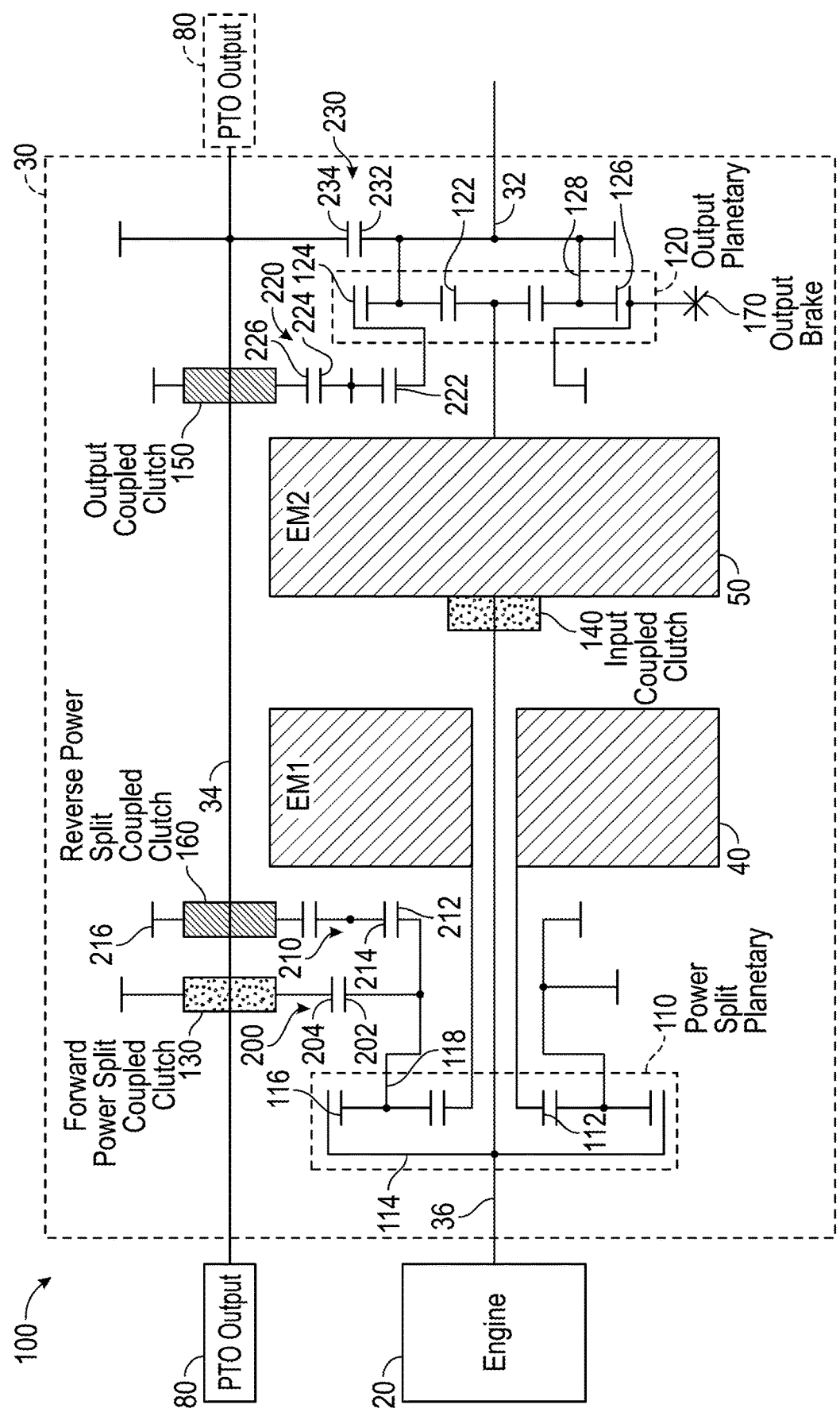
FIG. 5 is a detailed schematic view of a drive train configured in a neutral/startup mode of operation, according to another exemplary embodiment.

As shown in FIGS. 4-5, transmission 30 is selectively reconfigured into a neutral/startup mode. The neutral/startup mode may provide a true neutral for transmission 30. In one embodiment, at least one of first electromagnetic device 40 and second electromagnetic device 50 include and/or are coupled to an energy storage device (e.g., a capacitor, a battery, etc.) configured to store energy (e.g., electrical energy, chemical energy, etc.) associated with drive system 100. In one embodiment, rotation of second electromagnetic device 50 rotates connecting shaft 36 to start engine 20 (e.g., with input coupled clutch 140 engaged, etc.). By way of example, second electromagnetic device 50 may be configured to use the stored energy to start engine 20 by providing a rotational mechanical energy input (e.g., a torque, etc.) to engine 20 via connecting shaft 36. In another embodiment, rotation of first electromagnetic device 40 rotates connecting shaft 36 (e.g., where forward power split coupled clutch 130 and reverse power split coupled clutch 160 are engaged, etc.) to start engine 20. By way of example, first electromagnetic device 40 may be configured to use the stored energy to start engine 20 by providing a rotational mechanical energy input (e.g., a torque, etc.) to engine 20.

In an alternative embodiment, engine 20 includes a traditional starting mechanism (e.g., a starter motor, etc.) configured to start engine 20 (e.g., in response to a vehicle start request, in response to an engine start request, etc.). The vehicle start request and/or the engine start request may include a directive to turn the engine "on" from an "off" state. The vehicle may include at least one of a pushbutton, a graphical user interface, an ignition, and another device with which a user interacts to provide or trigger the vehicle start request and/or the engine start request. Engine 20 may provide a rotational mechanical energy input to at least one of first electromagnetic device 40 and/or second electromagnetic device 50. The first electromagnetic device 40 and second electromagnetic device 50 may be brought up to a threshold (e.g., a threshold speed, a threshold speed for a target period of time, a threshold power generation, a threshold power generation for a target period of time, etc.) that establishes a requisite DC bus voltage for controlling first electromagnetic device 40 and/or second electromagnetic device 50. Both first electromagnetic device 40 and second electromagnetic device 50 may thereafter be activated and controlled within and/or to desired states. The power electronics of control system 300 that control the motor-to-motor functions may be brought online during the neutral/startup mode.

As shown in FIGS. 4-5 and Table 1, output coupled clutch 150, output brake 170, and at least one of forward power split coupled clutch 130 and reverse power split coupled clutch 160 are engaged when transmission 30 is configured in the neutral/startup mode. According to an exemplary embodiment, engaging output brake 170, output coupled clutch 150, and at least one of forward power split coupled clutch 130 and reverse power split coupled clutch 160 selectively limits the rotational movement of portions of both power split planetary 110 and output planetary 120. By way of example, engaging output brake 170 may inhibit the rotational movement of ring gear 124, gear 222, gear 224, and gear 226 such that each remains rotationally fixed. Engaging output coupled clutch 150 may inhibit rotational movement of jack shaft 34 such that jack shaft 34 remains rotationally fixed (e.g., since gear 226 is fixed and output coupled clutch 150 is engaged, etc.). With jack shaft 34 rotationally fixed, gear set 230 becomes rotationally fixed, thereby isolating output shaft 32 from engine 20, first electromagnetic device 40, and second electromagnetic device 50 in the neutral/startup mode. Such isolation may substantially eliminate a forward lurch potential of the vehicle during startup (e.g., transmission 30 does not provide an output torque to tires 62 and/or tires 72, etc.). Engaging at least one of forward power split coupled clutch 130 and reverse power split coupled clutch 160 may inhibit rotational movement of gear set 200 and/or gear set 210, respectively. Fixing gear set 200 and/or gear set 210 rotationally fixes carrier 118.

According to an exemplary embodiment, an energy flow path in the neutral/startup mode includes: first electromagnetic device 40 providing a rotational mechanical energy input to sun gear 112 that is received by the plurality of planetary gears 116; the plurality of planetary gears 116 rotating about central axes thereof (e.g., planetary gears 116 may not rotate about sun gear 112 because carrier 118 may be rotationally fixed, etc.); the plurality of planetary gears 116 conveying the rotational mechanical energy to ring gear 114; ring gear 114 transferring the rotational mechanical energy to connecting shaft 36 such that the rotational mechanical energy provided by first electromagnetic device 40 starts engine 20. In other embodiments, input coupled clutch 140 is engaged in the neutral/startup mode such that rotational mechanical energy provided by second electromagnetic device 50 to connecting shaft 36 starts engine 20.

An alternative energy flow path in the neutral/startup mode may include starting engine 20 with a traditional starting mechanism, engine 20 providing a rotational mechanical energy input to ring gear 114 that is received by the plurality of planetary gears 116; the plurality of planetary gears 116 rotating about central axes thereof (e.g., planetary gears 116 may or may not rotate about sun gear 112 because carrier 118 may or may not be rotationally fixed, etc.); the plurality of planetary gears 116 conveying the rotational mechanical energy to sun gear 112; and sun gear 112 conveying the rotational mechanical energy to first electromagnetic device 40 to bring first electromagnetic device 40 up to the threshold for establishing a requisite DC bus voltage and controlling first electromagnetic device 40 and/or second electromagnetic device 50 in a desired state. By way of example, the neutral/startup mode may be used to start engine 20, establish a requisite DC bus voltage, or otherwise export power without relying on controller 310 to engage first electromagnetic device 40 and/or second electromagnetic device 50. Transmission 30 may provide increased export power potential relative to traditional transmission systems.

Figure 6:
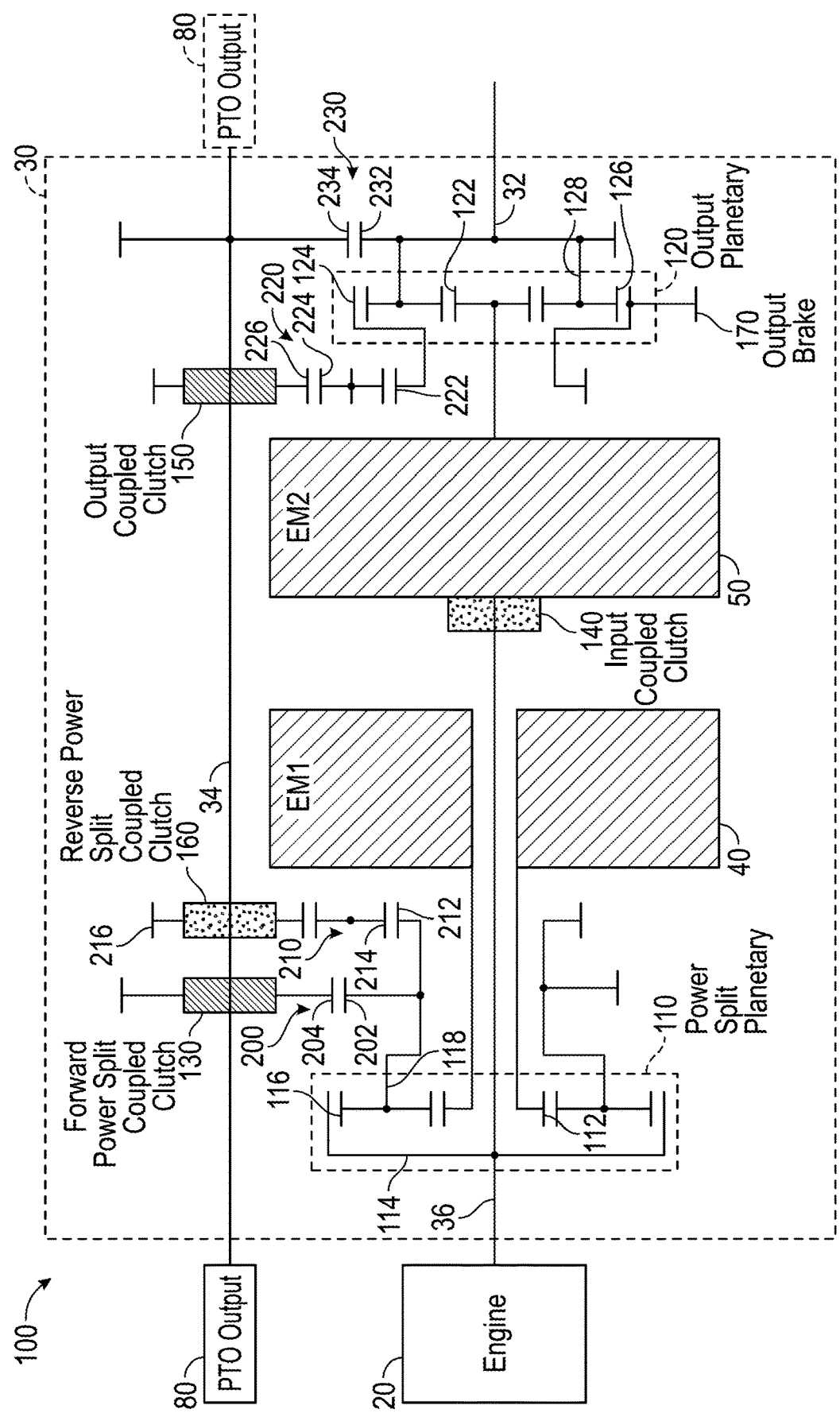
FIG. 6 is a detailed schematic view of a drive train configured in a low range forward mode of operation, according to an exemplary embodiment.

As shown in FIG. 6, transmission 30 is selectively reconfigured into a low range forward mode of operation such that transmission 30 allows for a low output speed operation with a high output torque in a forward driving direction. The low range forward mode increases a vehicle's gradability (e.g., facilitates the vehicle maintaining speed on a grade, etc.). In one embodiment, engine 20 provides a rotational mechanical energy input to transmission 30 such that first electromagnetic device 40 generates electrical power and second electromagnetic device 50 uses the generated electrical power to provide a rotational mechanical energy output. As such, at least one of engine 20 and second electromagnetic device 50 provide a rotational mechanical energy input to drive at least one of tires 62 and tires 72. In an alternative embodiment, first electromagnetic device 40 operates as a motor and second electromagnetic device 50 operates as a generator when transmission 30 is configured in the low range forward mode. In still another alternative embodiment, both first electromagnetic device 40 and second electromagnetic device 50 operate as a generator in the low range forward mode.

As shown in FIG. 6 and Table 1, forward power split coupled clutch 130 and output coupled clutch 150 are engaged when transmission 30 is configured in the low range forward mode. As shown in FIG. 6, forward power split coupled clutch 130 and output coupled clutch 150 couple carrier 118 of power split planetary 110 to ring gear 124 of output planetary 120 (e.g., via gear set 220, etc.), carrier 128 of output planetary 120, and output shaft 32 (via gear set 230, etc.). Accordingly, when engine 20 provides a rotational mechanical energy input to transmission 30, at least one of engine 20 and second electromagnetic device 50 drive output shaft 32 via the interaction of jack shaft 34 and output planetary 120 with gear set 230, respectively. According to the exemplary embodiment shown in FIG. 6, an energy flow path for the low range forward mode includes: engine 20 providing a rotational mechanical energy input to connecting shaft 36; connecting shaft 36 conveying the rotational mechanical energy to ring gear 114; ring gear 114 causing the plurality of planetary gears 116 to rotate about central axes thereof, as well as about sun gear 112 such that both carrier 118 and sun gear 112 rotate; and the rotation of sun gear 112 driving first electromagnetic device 40 such that it operates as a generator (e.g., generates electrical energy, etc.).

Referring still to FIG. 6, the rotation of carrier 118 drives gear set 200, causing jack shaft 34 to rotate. Jack shaft 34 drives both gear set 220 and gear set 230. Gear set 220 conveys the rotational input to ring gear 124 to rotate the plurality of planetary gears 126 about a central axis thereof. In one embodiment, second electromagnetic device 50 receives electrical energy generated by first electromagnetic device 40. Accordingly, second electromagnetic device 50 operates as a motor, providing a rotational mechanical energy input to sun gear 122. The sun gear 122 conveys the rotational mechanical energy from the second electromagnetic device 50 to the plurality of planetary gears 126 such that each further rotates about the central axis thereof. The plurality of planetary gears 126 drive carrier 128, and the rotation of carrier 128 drives gear 232. Jack shaft 34 drives gear 234 of gear set 230, which in turn drives gear 232. The rotational energy provided to gear 232 (e.g., from gear 234 and carrier 128, etc.) drives output shaft 32. According to the exemplary embodiment shown in FIG. 6, gear set 230 transfers a torque to output shaft 32 with forward power split coupled clutch 130 and output coupled clutch 150 engaged. As such, at least one of engine 20 and second electromagnetic device 50 move a vehicle at a low speed (e.g., in a forward direction, etc.) with a high output torque during the low range forward mode.

Figure 7:
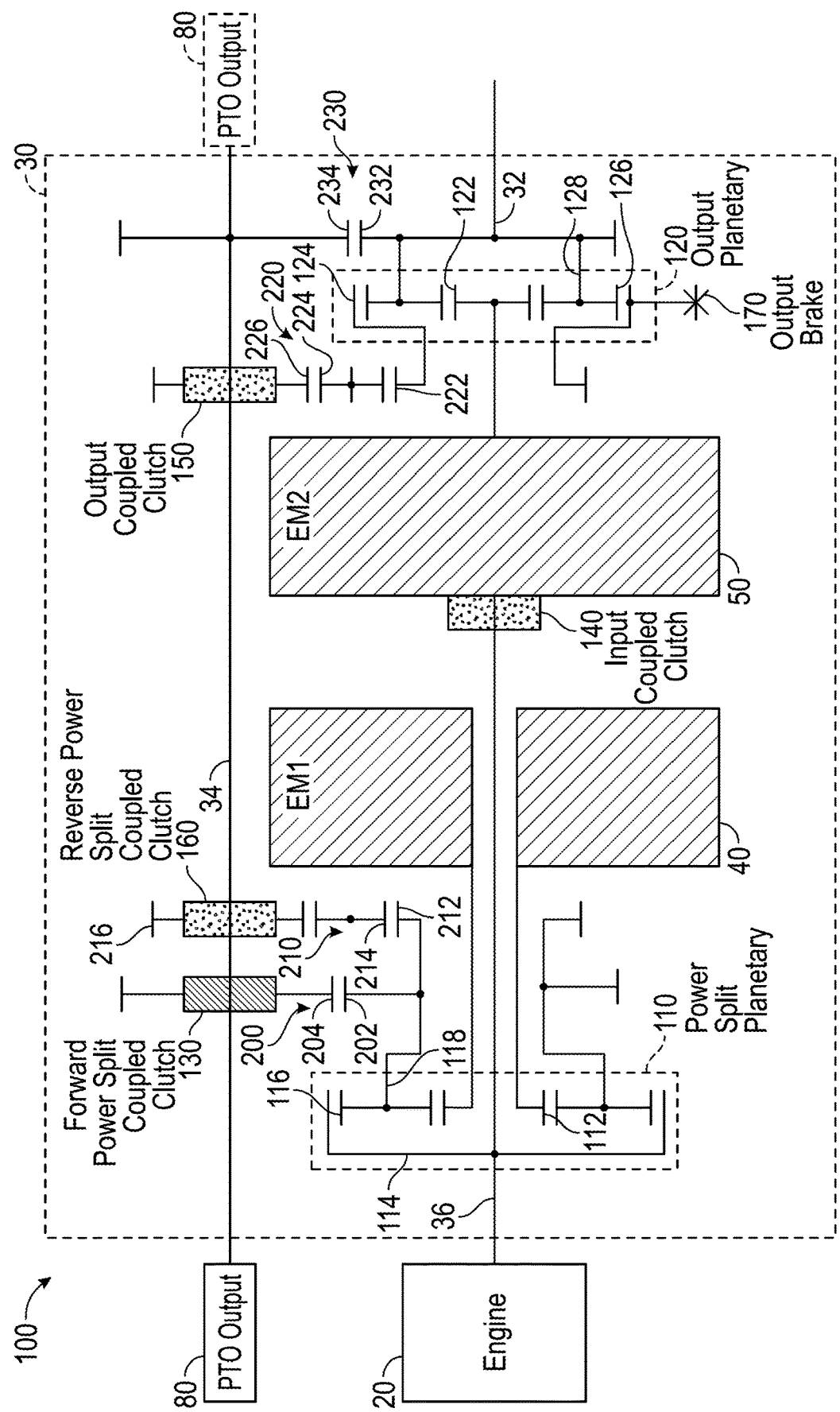
FIG. 7 is a detailed schematic view of a drive train configured in a mid range forward mode of operation, according to an exemplary embodiment.

As shown in FIG. 7, transmission 30 is selectively reconfigured into a mid range forward mode of operation. In the mid range forward mode of operation, transmission 30 may facilitate a mid range output speed operation (e.g., in a forward direction of travel, etc.). The speed range associated with the mid range mode of operation may be larger than that of traditional transmissions (i.e., transmission 30 may provide increased coverage in the mid range, etc.). The mid range forward mode may improve low output speed torque and high output speed power. In one embodiment, engine 20 provides a rotational mechanical energy input such that first electromagnetic device 40 generates electrical power, and second electromagnetic device 50 uses the generated electrical power to provide a rotational mechanical energy output. Second electromagnetic device 50 thereby provides a rotational mechanical energy input to drive at least one of tires 62 and tires 72. In an alternative embodiment, second electromagnetic device 50 operates as a generator while first electromagnetic device 40 operates as a motor when transmission 30 is configured in the mid range forward mode. In still another alternative embodiment, both first electromagnetic device 40 and second electromagnetic device 50 operate as a generator in the mid range forward mode.

As shown in FIG. 7 and Table 1, forward power split coupled clutch 130 and output brake 170 are engaged when transmission 30 is configured in the mid range forward mode. As shown in FIG. 7, output brake 170 inhibits the rotation of ring gear 124 and gear set 220 (e.g., gear 222, gear 224, gear 226, etc.). Output brake 170 thereby rotationally fixes ring gear 124 and gear set 220. In one embodiment, engaging output brake 170 substantially eliminates a power dip between output and input modes of transmission 30. According to the exemplary embodiment shown in FIG. 7, an energy flow path for the mid range forward mode includes: engine 20 providing a rotational mechanical energy input to connecting shaft 36 that is conveyed to ring gear 114; ring gear 114 driving the plurality of planetary gears 116 to rotate about central axes thereof, as well as about sun gear 112 such that both carrier 118 and sun gear 112 rotate; and the rotation of sun gear 112 driving first electromagnetic device 40 such that it operates as a generator (e.g., generates electrical energy, etc.).

With ring gear 124 fixed by output brake 170, second electromagnetic device 50 operates as a motor. In one embodiment, first electromagnetic device 40 operates as a generator, converting a rotational mechanical energy from sun gear 112 into electrical energy. Second electromagnetic device 50 receives the electrical energy generated by first electromagnetic device 40. Accordingly, second electromagnetic device 50 operates as a motor, providing a rotational mechanical energy input to sun gear 122. The sun gear 122 conveys the rotational mechanical torque to the plurality of planetary gears 126 such that each rotates about sun gear 122. The rotation of the plurality of planetary gears 126 (e.g., effected by sun gear 122, etc.) drives carrier 128 and thereby gear 232.

Referring still to FIG. 7, the rotation of carrier 118 drives gear set 200 causing jack shaft 34 to rotate. Jack shaft 34 drives gear 234 of gear set 230, which in turn further drives gear 232. Gear 232 then provides the rotational mechanical energy from engine 20 to output shaft 32. As shown in FIG. 7, forward power split coupled clutch 130 couples carrier 118 to output shaft 32 such that the rotational mechanical energy of carrier 118, received from engine 20, and the rotational mechanical energy of carrier 128, received from second electromagnetic device 50, drives output shaft 32 at a mid range output speed and may thereby drive a vehicle at a mid range output speed.

Figure 8:
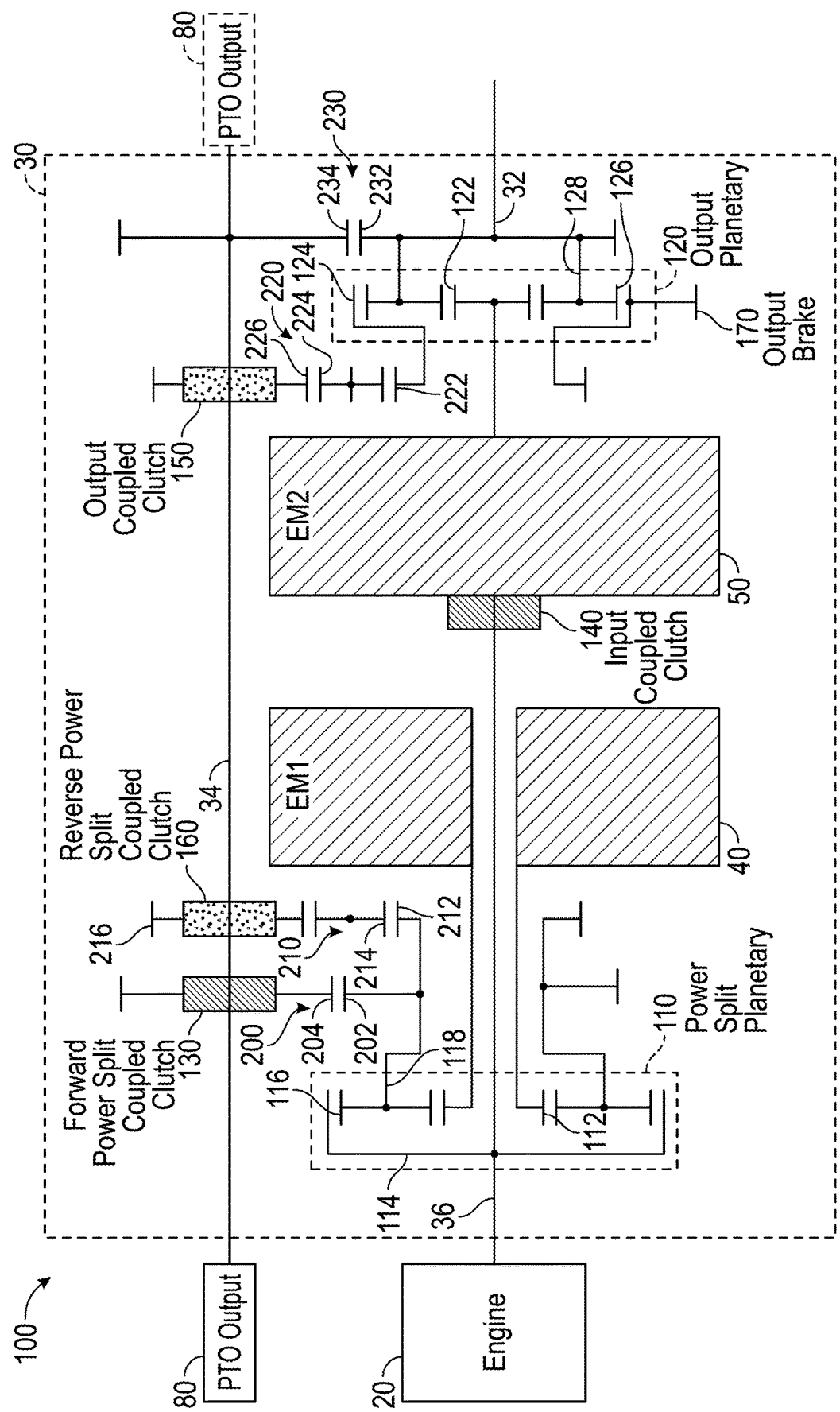
FIG. 8 is a detailed schematic view of a drive train configured in a high range forward mode of operation, according to an exemplary embodiment.

As shown in FIG. 8, transmission 30 is selectively reconfigured into a high range forward mode of operation such that transmission 30 allows for a high output speed operation (e.g., in a forward direction of travel, etc.). In one embodiment, engine 20 provides a rotational mechanical energy input such that second electromagnetic device 50 generates electrical power while first electromagnetic device 40 uses the generated electrical power to provide a rotational mechanical energy output. As such, at least one of engine 20 and first electromagnetic device 40 provide rotational mechanical energy to drive at least one of tires 62 and tires 72. In an alternative embodiment, first electromagnetic device 40 operates as a generator and second electromagnetic device 50 operates as a motor when transmission 30 is configured in the high range forward mode.

As shown in FIG. 8 and Table 1, forward power split coupled clutch 130 and input coupled clutch 140 are engaged when transmission 30 is configured in the high range forward mode. As shown in FIG. 8, the engagement of input coupled clutch 140 with connecting shaft 36 rotationally couples engine 20 and second electromagnetic device 50. By way of example, engine 20 may provide a rotational mechanical energy input to connecting shaft 36 such that second electromagnetic device 50 generates electrical energy. In one embodiment, first electromagnetic device 40 receives the electrical energy generated by second electromagnetic device 50. First electromagnetic device 40 operates as a motor, providing a rotational mechanical energy input to sun gear 112 that drives the plurality of planetary gears 116 and carrier 118.

Referring still to FIG. 8, power from engine 20 is transferred to ring gear 114 and the plurality of planetary gears 116. The plurality of planetary gears 116 are driven by at least one of engine 20 (e.g., via ring gear 114, etc.) and first electromagnetic device 40 (e.g., via sun gear 112, etc.). Carrier 118 rotates, which drives gear set 200. As shown in FIG. 8, forward power split coupled clutch 130 couples gear set 200 to output shaft 32 (e.g., via jack shaft 34 and gear set 230, etc.) such that the rotational mechanical energy provided by engine 20 and first electromagnetic device 40 drives a vehicle at a high range speed.

Figure 9:
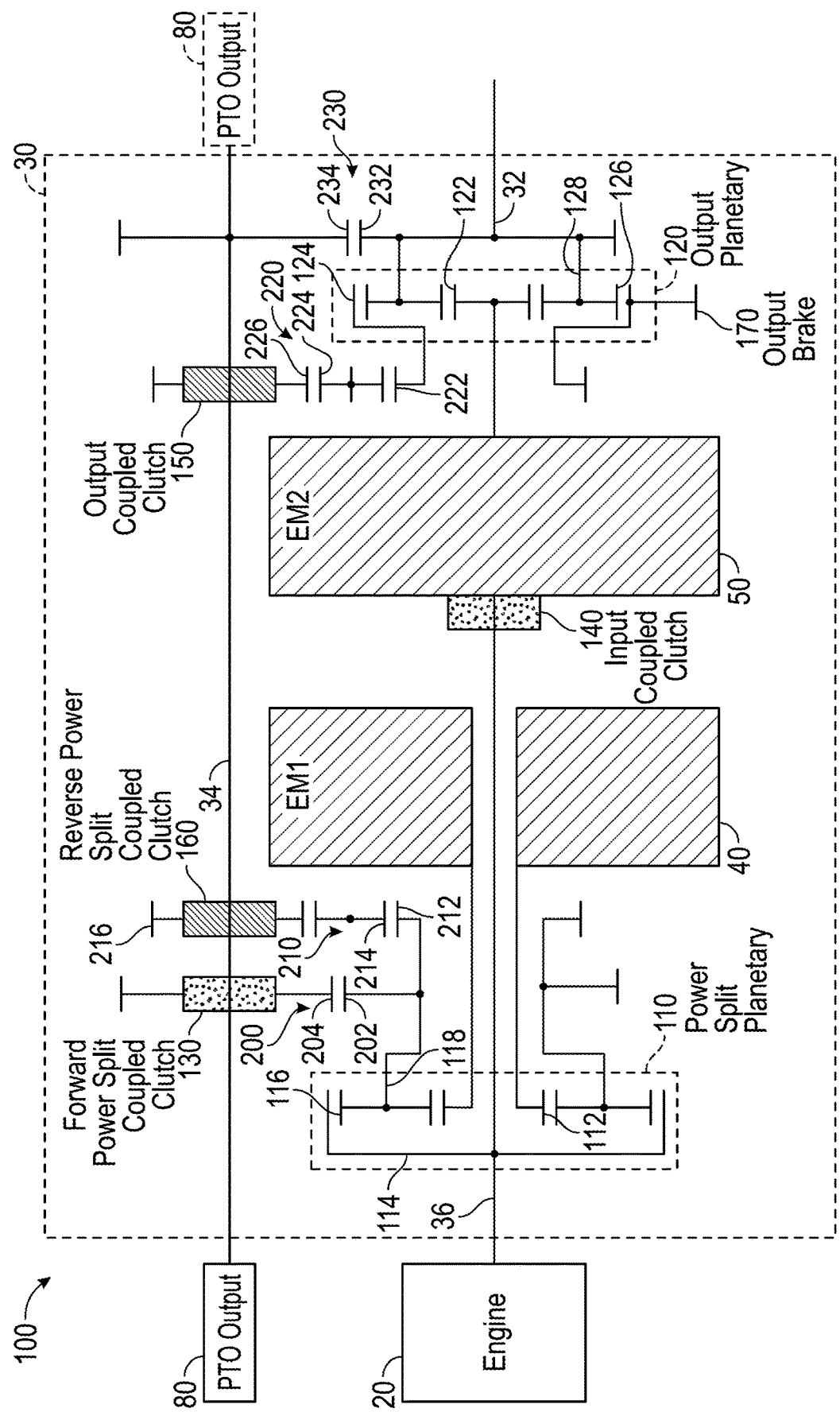
FIG. 9 is a detailed schematic view of a drive train configured in a low range reverse of operation, according to an exemplary embodiment.

As shown in FIG. 9, transmission 30 is selectively reconfigured into a low range reverse mode of operation. In one embodiment, engine 20 provides a rotational mechanical energy input to transmission 30 such that first electromagnetic device 40 generates electrical power and second electromagnetic device 50 uses the generated electrical power to provide a rotational mechanical energy input to transmission 30. As such, at least one of engine 20 and second electromagnetic device 50 provide rotational mechanical energy to drive at least one of tires 62 and tires 72 in a reverse direction (e.g., backwards, etc.). In an alternative embodiment, first electromagnetic device 40 operates as a motor and second electromagnetic device 50 operates as a generator when transmission 30 is configured in the low range reverse mode.

As shown in FIG. 9 and Table 1, reverse power split coupled clutch 160 and output coupled clutch 150 are engaged when transmission 30 is configured in the low range reverse mode. As shown in FIG. 9, the low range reverse mode is substantially similar to the low range forward mode of FIG. 6 except that forward power split coupled clutch 130 is disengaged decoupling gear set 200 from jack shaft 34 and reverse power split coupled clutch 160 is engaged coupling gear set 210 to jack shaft 34. According to an exemplary embodiment, the three gear arrangement of gear set 210 facilitates driving jack shaft 34 in an opposing direction relative to the two gear arrangement of gear set 200. Thus, gear set 210 causes engine 20 to drive output shaft 32 in an opposite direction (i.e., relative to the low range forward mode) causing a vehicle to drive in a reverse direction (e.g., backwards, etc.). In the low range reverse mode, second electromagnetic device 50 may provide a rotational mechanical energy output in an opposite direction as compared to the low range forward mode of FIG. 6.

Figure 10:
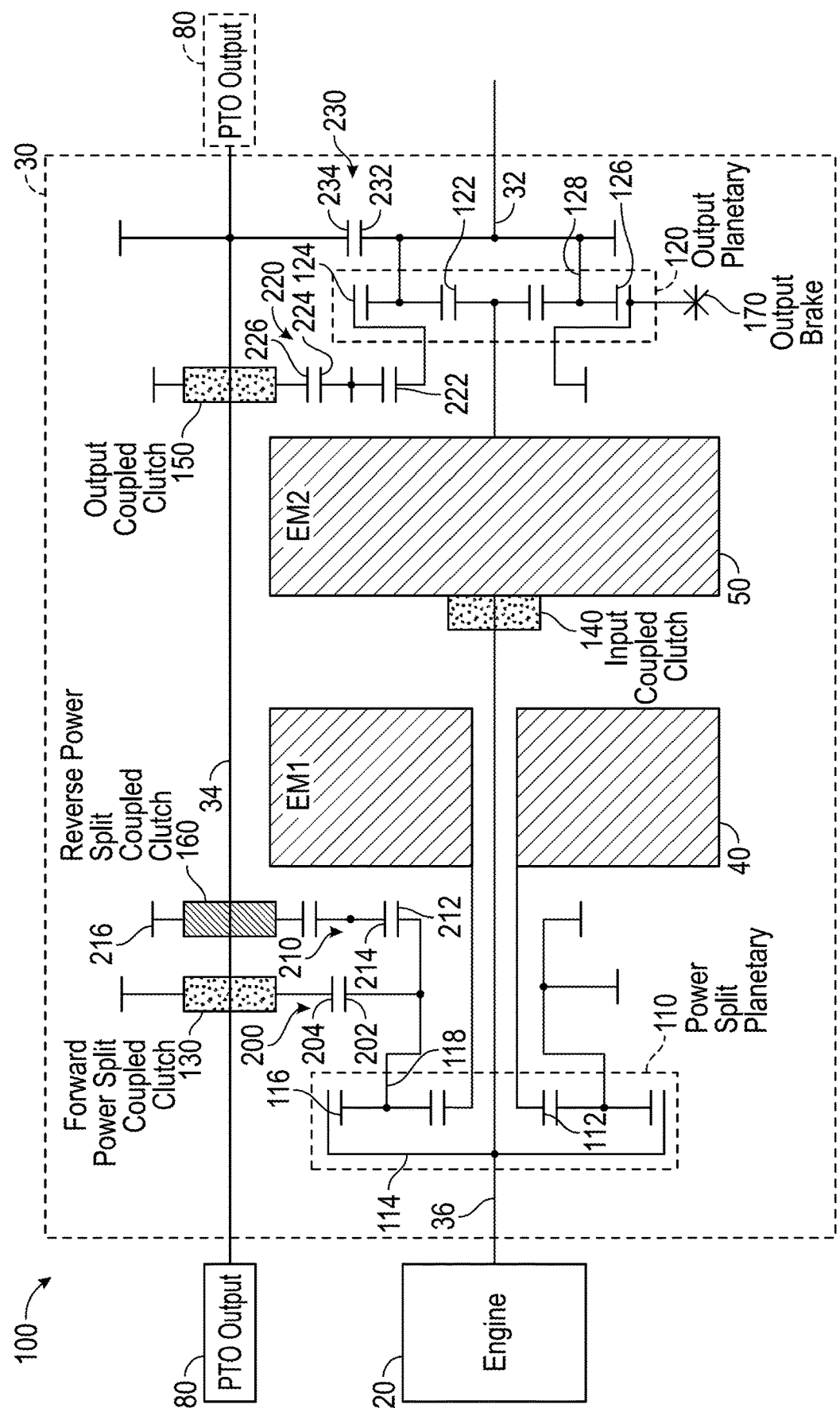
FIG. 10 is a detailed schematic view of a drive train configured in a mid range reverse mode of operation, according to an exemplary embodiment.

As shown in FIG. 10, transmission 30 is selectively reconfigured into a mid range reverse mode of operation. The speed range associated with the mid range reverse mode of operation may be larger than that of traditional transmissions (i.e., transmission 30 may provide increased coverage in the mid range, etc.). In one embodiment, engine 20 provides a rotational mechanical energy input to transmission 30 such that first electromagnetic device 40 generates electrical power and second electromagnetic device 50 uses the generated electrical power to provide a rotational mechanical energy output. As such, at least one of engine 20 and second electromagnetic device 50 provide rotational mechanical energy to drive at least one of tires 62 and tires 72 in a reverse direction (e.g., backwards, etc.). In an alternative embodiment, first electromagnetic device 40 operates as a motor and second electromagnetic device 50 operates as a generator when transmission 30 is configured in the mid range reverse mode.

As shown in FIG. 10 and Table 1, reverse power split coupled clutch 160 and output brake 170 are engaged when transmission 30 is configured in the mid range reverse mode. As shown in FIG. 10, the mid range reverse mode is substantially similar to the mid range forward mode of FIG. 7 except that forward power split coupled clutch 130 is disengaged decoupling gear set 200 from jack shaft 34 and reverse power split coupled clutch 160 is engaged coupling gear set 210 to jack shaft 34. According to an example embodiment, the three gear arrangement of gear set 210 facilitates driving jack shaft 34 in an opposing direction relative to the two gear arrangement of gear set 200. Thus, gear set 210 causes engine 20 to drive output shaft 32 in an opposite direction (i.e., relative to the mid range forward mode) causing a vehicle to drive in a reverse direction (e.g., backwards, etc.). In the mid range reverse mode, second electromagnetic device 50 may provide a rotational mechanical energy output in an opposite direction as compared to the mid range forward mode of FIG. 7.

Figure 11:
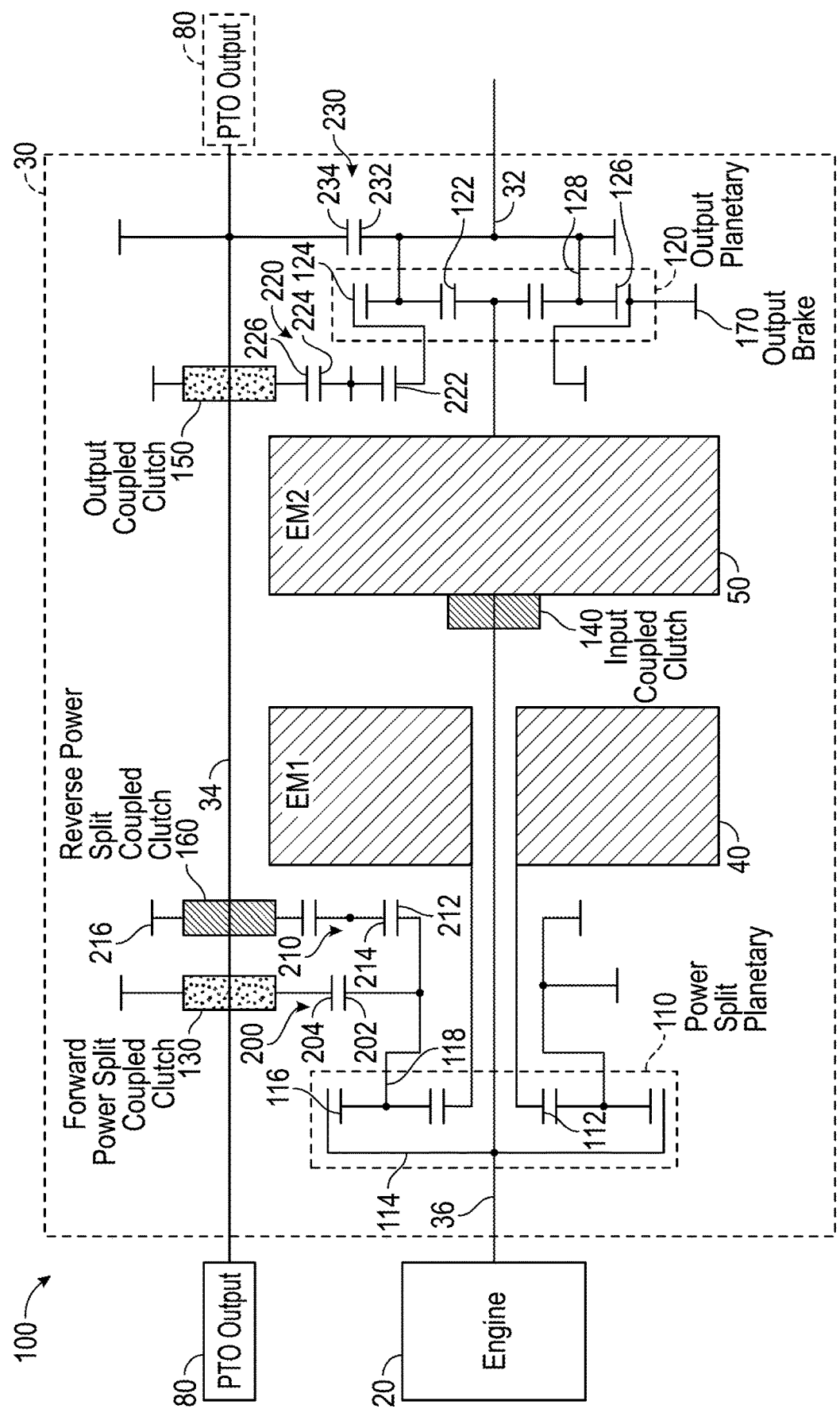
FIG. 11 is a detailed schematic view of a drive train configured in a high range reverse mode of operation, according to an exemplary embodiment.

As shown in FIG. 11, transmission 30 is selectively reconfigured into a high range reverse mode of operation. In one embodiment, engine 20 provides a rotational mechanical energy input to transmission 30 such that second electromagnetic device 50 generates electrical power and first electromagnetic device 40 uses the generated electrical power to provide a rotational mechanical energy output. As such, at least one of engine 20 and first electromagnetic device 40 provide rotational mechanical energy to drive at least one of tires 62 and tires 72 in a reverse direction (e.g., backwards, etc.). In an alternative embodiment, second electromagnetic device 50 operates as a motor and first electromagnetic device 40 operates as a generator when transmission 30 is configured in the high range reverse mode.

As shown in FIG. 11 and Table 1, reverse power split coupled clutch 160 and input coupled clutch 140 are engaged when transmission 30 is configured in the high range reverse mode. As shown in FIG. 11, the high speed reverse range mode is substantially similar to the high range forward mode of FIG. 8 except that forward power split coupled clutch 130 is disengaged decoupling gear set 200 from jack shaft 34 and reverse power split coupled clutch 160 is engaged coupling gear set 210 to jack shaft 34. According to an example embodiment, the three gear arrangement of gear set 210 facilitates driving jack shaft 34 in an opposing direction relative to the two gear arrangement of gear set 200. Thus, gear set 210 causes engine 20 and first electromagnetic device 40 to drive output shaft 32 in an opposite direction (i.e., relative to the high range forward mode) causing a vehicle to drive in a reverse direction (e.g., backwards, etc.).

According to an example embodiment, the drive system 100 does not experience a subtraction effect during the reverse modes of operation since the jack shaft 34 is able to be driven in an opposite direction (e.g., relative to the forward modes, etc.) due to the three gear arrangement of gear set 210. The opposite rotation of jack shaft 34 drives output shaft 32 (e.g., via gear set 230, etc.) in an opposing direction (e.g., relative to the forward modes, etc.). Also, second electromagnetic device 50 may provide an input to output planetary 120 such that the rotational direction of carrier 128 matches that of gear 232 such that both inputs driving output shaft 32 (e.g., from engine 20 and second electromagnetic device 50, etc.) are additive, not subtractive. Further, first electromagnetic device 40 may provide an input to power split planetary 110 to be additive to the input of engine 20 provided to power split planetary 110 via connecting shaft 36.

According to an alternative embodiment, engine 20 does not provide a rotational mechanical energy input to drive a vehicle. By way of example, first electromagnetic device 40, second electromagnetic device 50, and/or another device may store energy during the above mentioned modes of operation. When sufficient energy is stored (e.g., above a threshold level, etc.), at least one of first electromagnetic device 40 and second electromagnetic device 50 may provide a rotational mechanical energy output such that the vehicle is driven without an input from engine 20 (e.g., an electric mode, etc.).

Figure 12:
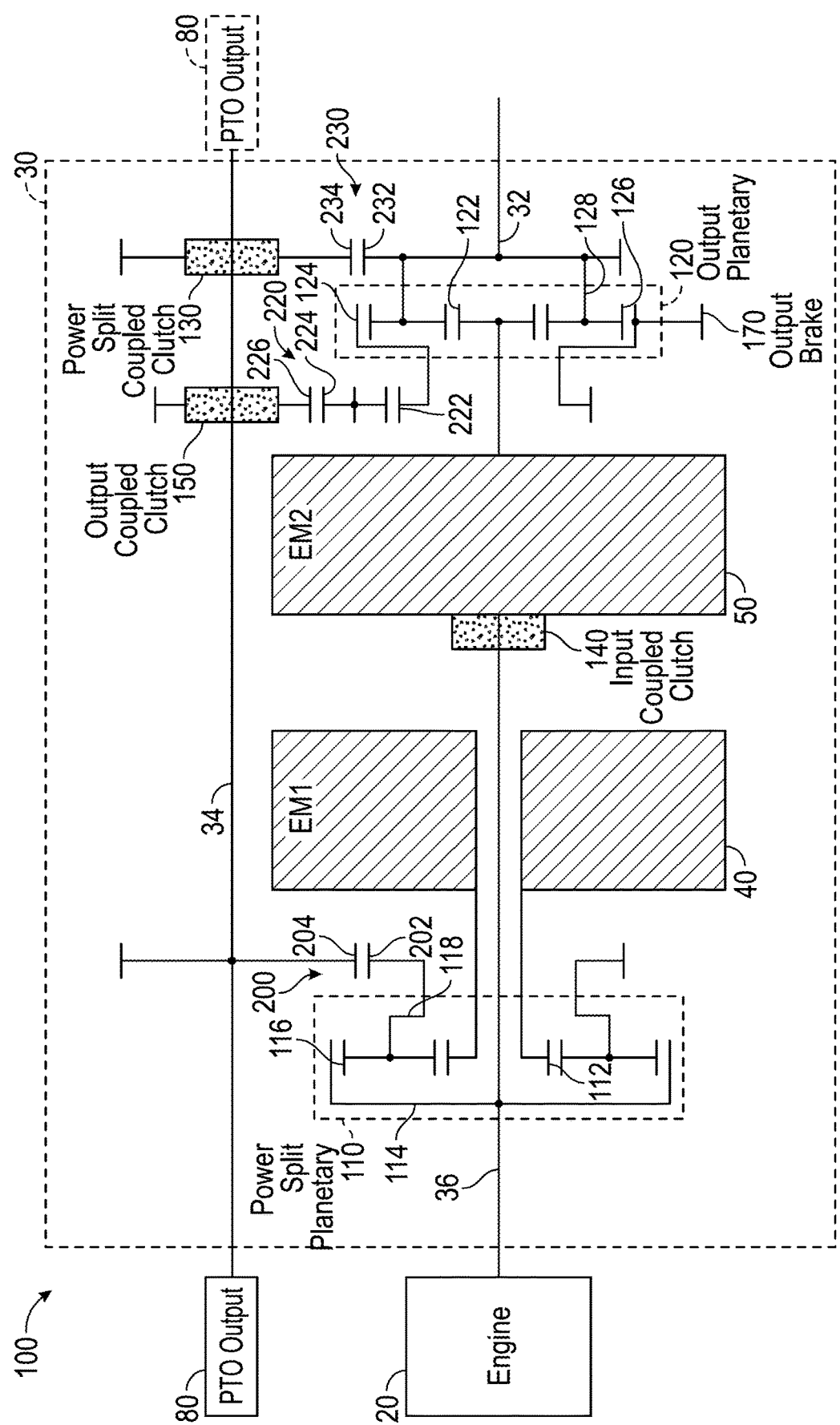
FIG. 12 is a detailed schematic view of the drive train of FIG. 1, according to an alternative embodiment.

According to the exemplary embodiment shown in FIG. 12, an alternative drive system 100 for a vehicle does not include reverse power split coupled clutch 160 or gear set 210. Further, power split coupled clutch 130 is relocated from being coupled to gear set 200 to gear set 230 in the alternative drive system 100. Referring next to the exemplary embodiment shown in FIGS. 13-16, transmission 30 is configured to operate according to a plurality of modes of operation. Various modes of operation for transmission 30 of FIG. 12 are identified below in Table 2. In other embodiments, a vehicle having transmission 30 is configured to operate according to the various modes of operation shown in FIGS. 13-16 and identified below in Table 2.

TABLE 2

| Mode of Operation | Power Split Coupled Clutch 130 | Output Coupled Clutch 150 | Output Brake 170 | Input Coupled Clutch 140 |
|---|---|---|---|---|
| Neutral/Vehicle Start | | X | X | |
| Low Range | X | X | | |
| Mid Range | X | | X | |
| High Range | X | | | X |

As shown in Table 2, an "X" represents a component of drive system 100 (e.g., output brake 170, power split coupled clutch 130, etc.) that is engaged or closed during the respective modes of operation.

Figure 13:
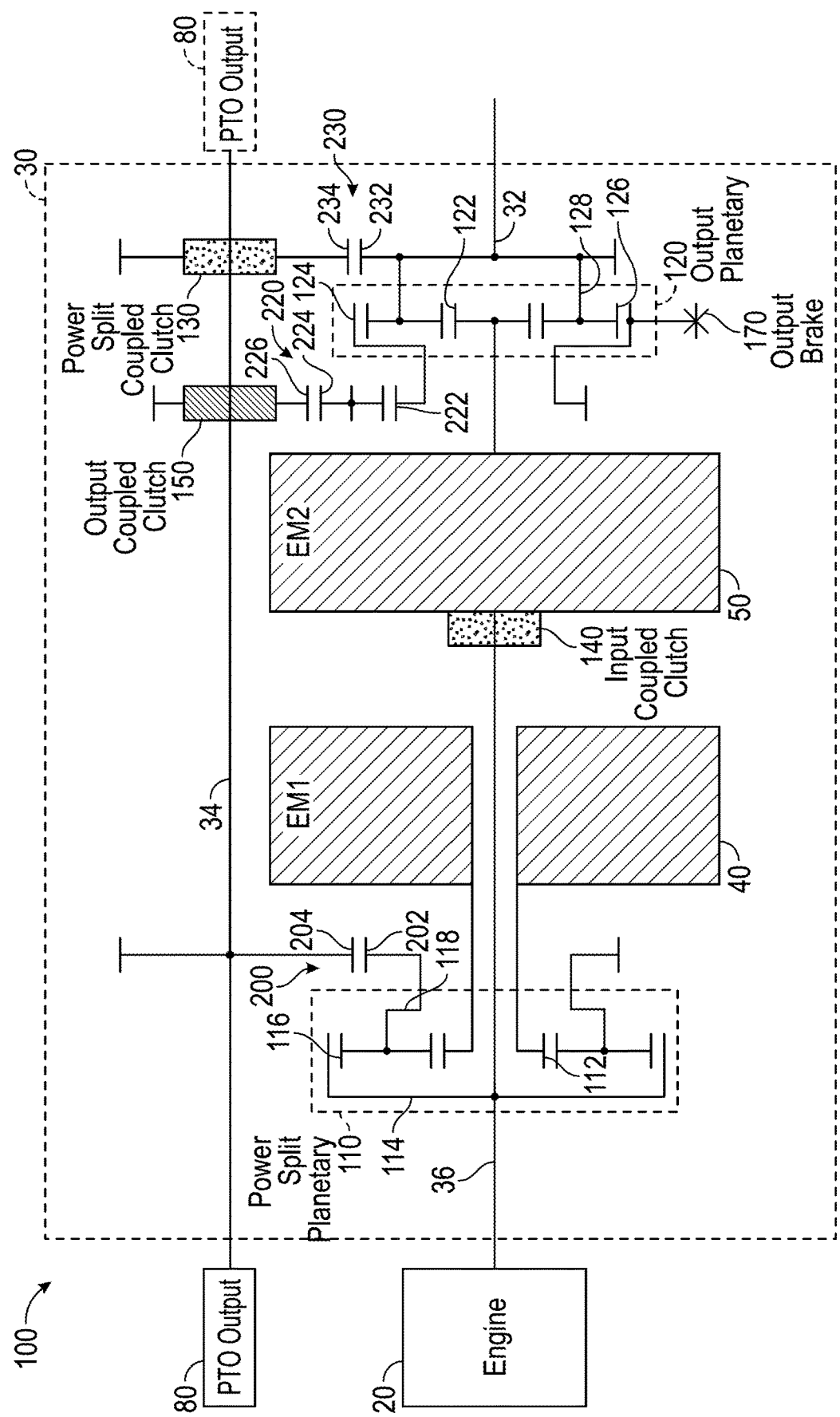
FIG. 13 is a detailed schematic view of a drive train configured in a neutral/startup mode of operation, according to an alternative embodiment.

As shown in FIG. 13, transmission 30 is selectively reconfigured into a neutral/startup mode. In one embodiment, at least one of first electromagnetic device 40 and second electromagnetic device 50 include and/or are coupled an energy storage device (e.g., a capacitor, a battery, etc.) configured to store energy (e.g., electrical energy, chemical energy, etc.) associated with drive system 100. In one embodiment, rotation of second electromagnetic device 50 rotates connecting shaft 36 to start engine 20 (e.g., with input coupled clutch 140 engaged, etc.). By way of example, second electromagnetic device 50 may be configured to use the stored energy to start engine 20 by providing a rotational mechanical energy input (e.g., a torque, etc.) to engine 20 via connecting shaft 36. In another embodiment, rotation of first electromagnetic device 40 rotates connecting shaft 36 to start engine 20. By way of example, first electromagnetic device 40 may be configured to use the stored energy to start engine 20 by providing a rotational mechanical energy input (e.g., a torque, etc.) to engine 20.

As shown in FIG. 13 and Table 2, output coupled clutch 150 and output brake 170 are engaged when transmission 30 is configured in the neutral/startup mode. According to an exemplary embodiment, engaging output brake 170 and output coupled clutch 150 selectively limits the rotational movement of portions of both power split planetary 110 and output planetary 120. By way of example, engaging output brake 170 may inhibit the rotational movement of ring gear 124, gear 222, gear 224, and gear 226 such that each remains rotationally fixed. Engaging output coupled clutch 150 may inhibit rotational movement of jack shaft 34 such that jack shaft 34 remains rotationally fixed (e.g., since gear 226 is fixed and output coupled clutch 150 is engaged, etc.). With jack shaft 34 rotationally fixed, gear set 230 becomes rotationally fixed, thereby isolating output shaft 32 from engine 20, first electromagnetic device 40, and second electromagnetic device 50 in the neutral/startup mode. Such isolation may substantially eliminate a forward lurch potential of the vehicle (e.g., transmission 30 does not provide an output torque to tires 62 and/or tires 72, etc.). Rotationally fixing jack shaft 34 may inhibit rotational movement of gear set 200. Fixing gear set 200 rotationally fixes carrier 118.

According to an exemplary embodiment, an energy flow path in the neutral/startup mode includes: first electromagnetic device 40 providing a rotational mechanical energy input to sun gear 112 that is received by the plurality of planetary gears 116; the plurality of planetary gears 116 rotating about central axes thereof (e.g., planetary gears 116 may not rotate about sun gear 112 because carrier 118 may be rotationally fixed, etc.); the plurality of planetary gears 116 conveying the rotational mechanical energy to ring gear 114; ring gear 114 transferring the rotational mechanical energy to connecting shaft 36 such that the rotational mechanical energy provided by first electromagnetic device 40 starts engine 20. In other embodiments, input coupled clutch 140 is engaged in the neutral/startup mode such that rotational mechanical energy provided by second electromagnetic device 50 to connecting shaft 36 starts engine 20.

Figure 14:
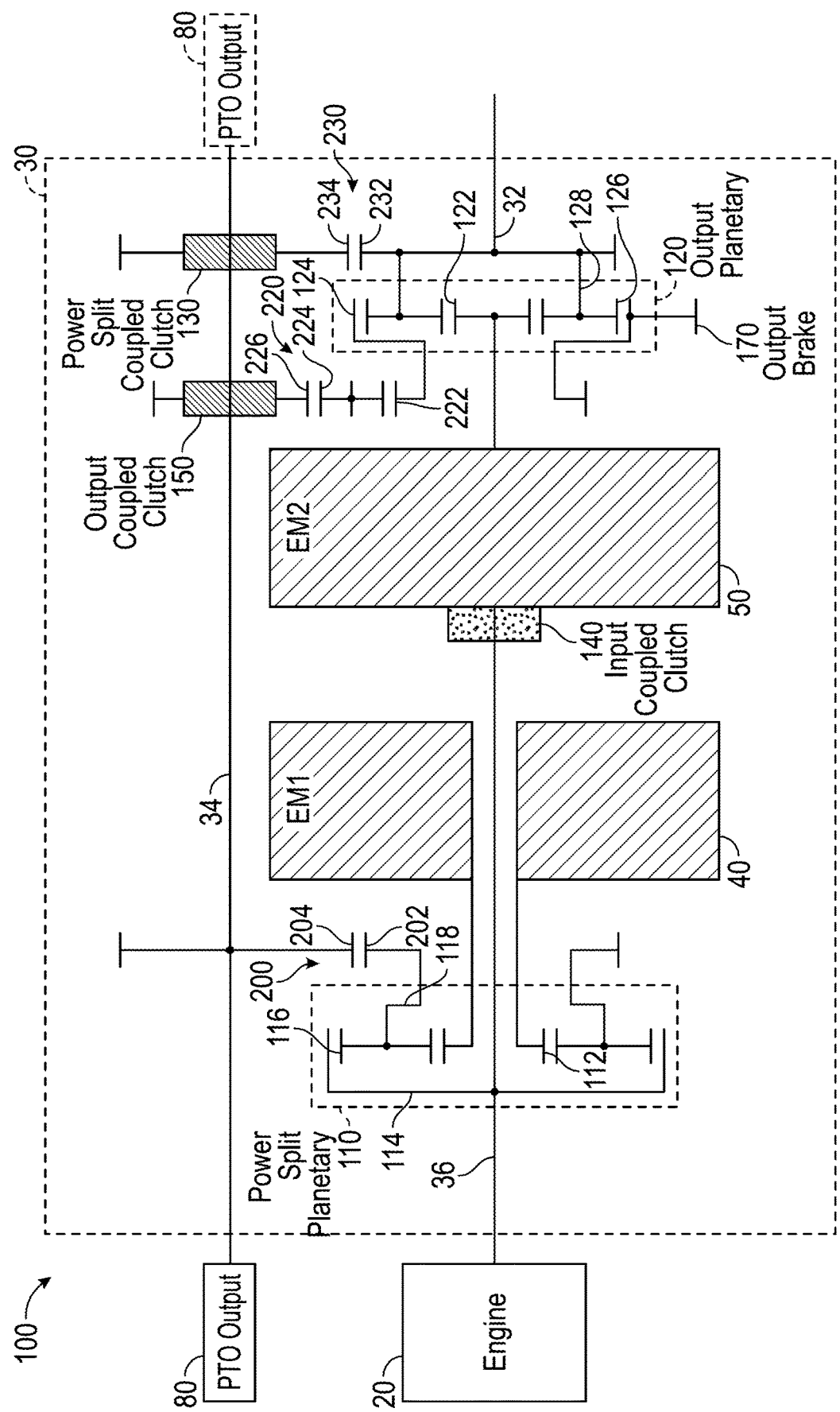
FIG. 14 is a detailed schematic view of a drive train configured in a low range mode of operation, according to an alternative embodiment.

As shown in FIG. 14, transmission 30 is selectively reconfigured into a low range mode of operation such that transmission 30 allows for a low output speed operation with a high output torque in either a forward driving direction or a reverse driving direction. The low range mode increases a vehicle's gradability (e.g., facilitates the vehicle maintaining speed on a grade, etc.). In one embodiment, engine 20 provides a rotational mechanical energy input to transmission 30 such that first electromagnetic device 40 generates electrical power and second electromagnetic device 50 uses the generated electrical power to provide a rotational mechanical energy output. As such, at least one of engine 20 and second electromagnetic device 50 provide rotational mechanical energy to drive at least one of tires 62 and tires 72. In an alternative embodiment, first electromagnetic device 40 operates as a motor and second electromagnetic device 50 operates as a generator when transmission 30 is configured in the low range mode. In still another alternative embodiment, both first electromagnetic device 40 and second electromagnetic device 50 operate as a generator in the low range mode.

As shown in FIG. 14 and Table 2, power split coupled clutch 130 and output coupled clutch 150 are engaged when transmission 30 is configured in the low range mode. As shown in FIG. 14, power split coupled clutch 130 and output coupled clutch 150 couple carrier 118 of power split planetary 110 to ring gear 124 of output planetary 120 (e.g., via gear set 220, etc.), and output shaft 32 (via gear set 230, etc.). Accordingly, when engine 20 provides a rotational mechanical energy input to transmission 30, at least one of engine 20 and second electromagnetic device 50 drive output shaft 32 via the interaction of jack shaft 34 and output planetary 120 with gear set 230, respectively. According to the exemplary embodiment shown in FIG. 14, an energy flow path for the low range mode includes: engine 20 providing a rotational mechanical energy input to connecting shaft 36; connecting shaft 36 conveying the rotational mechanical energy to ring gear 114; ring gear 114 causing the plurality of planetary gears 116 to rotate about central axes thereof, as well as about sun gear 112 such that both carrier 118 and sun gear 112 rotate; and the rotation of sun gear 112 driving first electromagnetic device 40 such that it operates as a generator (e.g., generates electrical energy, etc.).

Referring still to FIG. 14, the rotation of carrier 118 drives gear set 200, causing jack shaft 34 to rotate. Jack shaft 34 drives both gear set 220 and gear set 230. Gear set 220 conveys the rotational input to ring gear 124 to rotate the plurality of planetary gears 126 about a central axis thereof. In one embodiment, second electromagnetic device 50 receives electrical energy generated by first electromagnetic device 40. Accordingly, second electromagnetic device 50 operates as a motor, providing a rotational mechanical energy input to sun gear 122. The sun gear 122 conveys the rotational mechanical energy from the second electromagnetic device 50 to the plurality of planetary gears 126 such that each further rotates about the central axis thereof. The plurality of planetary gears 126 drive carrier 128, and the rotation of carrier 128 drives gear 232. Jack shaft 34 drives gear 234 of gear set 230, which in turn drives gear 232. The rotational energy provided to gear 232 (e.g., from gear 234 and carrier 128, etc.) drives output shaft 32.

Figure 15:
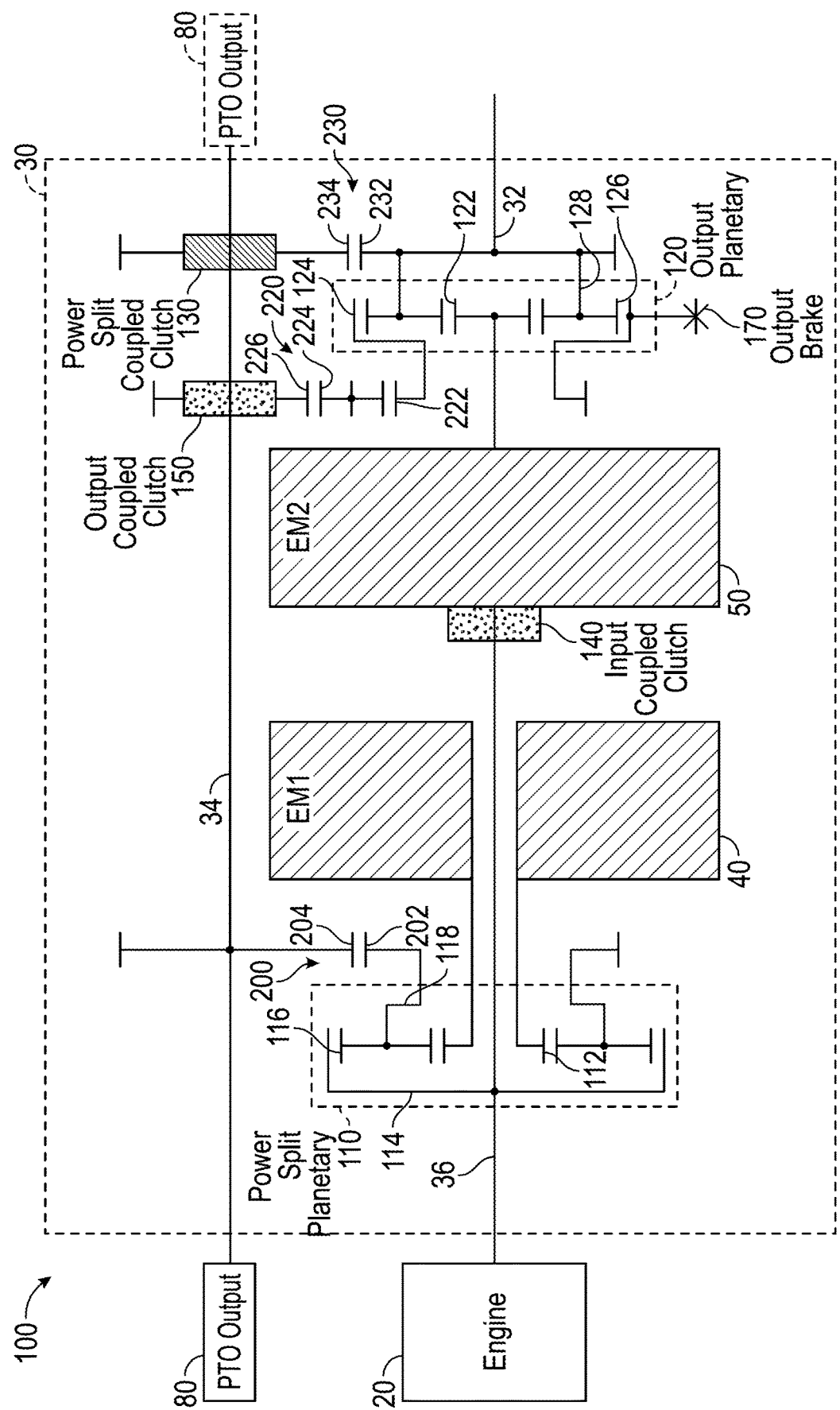
FIG. 15 is a detailed schematic view of a drive train configured in a mid range mode of operation, according to an alternative embodiment.

As shown in FIG. 15, transmission 30 is selectively reconfigured into a mid range mode of operation such that transmission 30 allows for a mid range output speed operation (e.g., in a forward direction of travel, in a reverse direction of travel, etc.). The mid range mode may improve low output speed torque and high output speed power. In one embodiment, engine 20 provides a rotational mechanical energy input such that first electromagnetic device 40 generates electrical power, and second electromagnetic device 50 uses the generated electrical power to provide a rotational mechanical energy output. As such, at least one of engine 20 and second electromagnetic device 50 thereby provide rotational mechanical energy to drive at least one of tires 62 and tires 72. In an alternative embodiment, second electromagnetic device 50 operates as a generator while first electromagnetic device 40 operates as a motor when transmission 30 is configured in the mid range mode. In still another alternative embodiment, both first electromagnetic device 40 and second electromagnetic device 50 operate as a generator in the mid range mode.

As shown in FIG. 15 and Table 2, power split coupled clutch 130 and output brake 170 are engaged when transmission 30 is configured in the mid range mode. As shown in FIG. 15, output brake 170 inhibits the rotation of ring gear 124 and gear set 220 (e.g., gear 222, gear 224, gear 226, etc.). Output brake 170 thereby rotationally fixes ring gear 124 and gear set 220. In one embodiment, engaging output brake 170 substantially eliminates a power dip between output and input modes of transmission 30. According to the exemplary embodiment shown in FIG. 15, an energy flow path for the mid range mode includes: engine 20 providing a rotational mechanical energy input to connecting shaft 36 that is conveyed to ring gear 114; ring gear 114 driving the plurality of planetary gears 116 to rotate about central axes thereof, as well as about sun gear 112 such that both carrier 118 and sun gear 112 rotate; and the rotation of sun gear 112 driving first electromagnetic device 40 such that it operates as a generator (e.g., generates electrical energy, etc.).

With ring gear 124 fixed by output brake 170, second electromagnetic device 50 operates as a motor. In one embodiment, first electromagnetic device 40 operates as a generator, converting a rotational mechanical energy from sun gear 112 into electrical energy. Second electromagnetic device 50 receives the electrical energy generated by first electromagnetic device 40. Accordingly, second electromagnetic device 50 operates as a motor, providing a rotational mechanical energy input to sun gear 122. The sun gear 122 conveys the rotational mechanical torque to the plurality of planetary gears 126 such that each rotates about sun gear 122. The rotation of the plurality of planetary gears 126 (e.g., effected by sun gear 122, etc.) drives carrier 128 and thereby gear 232.

Referring still to FIG. 15, the rotation of carrier 118 drives gear set 200 causing jack shaft 34 to rotate. Jack shaft 34 drives gear 234 of gear set 230, which in turn further drives gear 232. Gear 232 then provides the rotational mechanical energy from engine 20 and second electromagnetic device 50 to output shaft 32. As shown in FIG. 15, power split coupled clutch 130 couples carrier 118 to output shaft 32 such that the rotational mechanical energy of carrier 118, received from engine 20, and the rotational mechanical energy of carrier 128, received from second electromagnetic device 50, drives output shaft 32 at a mid range output speed and may thereby drive a vehicle at a mid range output speed.

Figure 16:
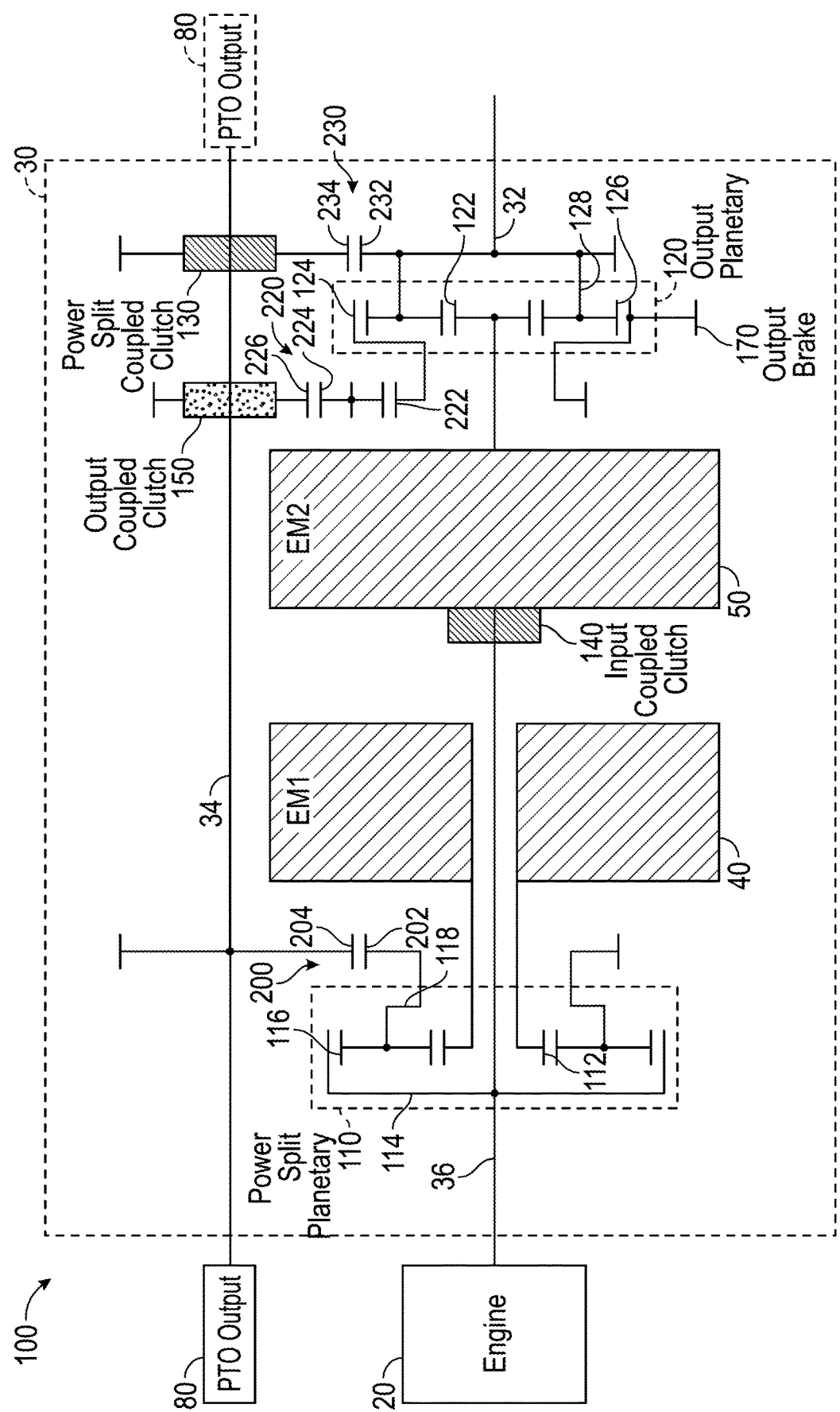
FIG. 16 is a detailed schematic view of a drive train configured in a high range mode of operation, according to an alternative embodiment.

As shown in FIG. 16, transmission 30 is selectively reconfigured into a high range mode of operation such that transmission 30 allows for a high output speed operation (e.g., in a forward direction of travel, in a reverse direction of travel, etc.). In one embodiment, engine 20 provides a rotational mechanical energy input such that second electromagnetic device 50 generates electrical power while first electromagnetic device 40 uses the generated electrical power to provide a rotational mechanical energy output. As such, at least one of engine 20 and first electromagnetic device 40 provide rotational mechanical energy to drive at least one of tires 62 and tires 72. In an alternative embodiment, first electromagnetic device 40 operates as a generator and second electromagnetic device 50 operates as a motor when transmission 30 is configured in the high range forward mode.

As shown in FIG. 16 and Table 2, power split coupled clutch 130 and input coupled clutch 140 are engaged when transmission 30 is configured in the high range mode. As shown in FIG. 16, the engagement of input coupled clutch 140 with connecting shaft 36 rotationally couples engine 20 and second electromagnetic device 50. By way of example, engine 20 may provide a rotational mechanical energy input to connecting shaft 36 such that second electromagnetic device 50 generates electrical energy. In one embodiment, first electromagnetic device 40 receives the electrical energy generated by second electromagnetic device 50. First electromagnetic device 40 operates as a motor, providing a rotational mechanical energy input to sun gear 112 that drives the plurality of planetary gears 116 and carrier 118.

Referring still to FIG. 16, power from engine 20 is transferred to ring gear 114 and the plurality of planetary gears 116. The plurality of planetary gears 116 are driven by at least one of engine 20 (e.g., via ring gear 114, etc.) and first electromagnetic device 40 (e.g., via sun gear 112, etc.). Carrier 118 rotates, which drives gear set 200. As shown in FIG. 16, power split coupled clutch 130 couples power split planetary 110 to output shaft 32 (e.g., via gear set 200, jack shaft 34, and gear set 230, etc.) such that the rotational mechanical energy provided by engine 20 and first electromagnetic device 40 drives a vehicle at a high range speed.

According to an exemplary embodiment of the alternative drive system 100 of FIGS. 12-16, engine 20 and at least one of first electromagnetic device 40 and second electromagnetic device 50 drive output shaft 32 in the same direction (e.g., causing forward movement of the vehicle, etc.). According to another exemplary embodiment of the alternative drive system 100 of FIGS. 12-16, the engine 20 and at least one of first electromagnetic device 40 and second electromagnetic device 50 drive output shaft 32 is opposing directions (e.g., second electromagnetic device 50 drives output shaft 32 faster in an opposing direction causing backward movement of the vehicle, etc.).

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps. contrariwise As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A drive system for a vehicle, comprising:
a first gear set including a first sun gear, a first ring gear, a first plurality of planetary gears coupling the first sun gear to the first ring gear, and a first carrier rotationally supporting the first plurality of planetary gears;
a second gear set including a second sun gear, a second ring gear, a second plurality of planetary gears coupling the second sun gear to the second ring gear, and a second carrier rotationally supporting the second plurality of planetary gears, wherein the first carrier is selectively coupled to the second carrier;
a connecting shaft coupled to the first gear set;
a first electrical machine coupled to the first gear set;
a second electrical machine coupled to the second gear set;
an output shaft configured to transport power from the first electrical machine and the second electrical machine to a tractive element of the vehicle;
a first clutch selectively rotationally coupling the first gear set to the output shaft when engaged; and
a second clutch selectively rotationally coupling the first gear set to the output shaft when engaged;
wherein the output shaft is aligned with the connecting shaft, the first electrical machine, and the second electrical machine to thereby form a straight-thru transmission arrangement; and
wherein the first clutch is configured to be engaged when the drive system is selectively reconfigured into a forward mode of operation, and wherein the second clutch is configured to be engaged when the drive system is selectively reconfigured into a reverse mode of operation.

2. The drive system of claim 1, wherein the connecting shaft is directly coupled to the first ring gear, wherein the first electrical machine is directly coupled to the first sun gear, and wherein the second electrical machine is directly coupled to the second sun gear.

3. The drive system of claim 1, wherein the first clutch selectively rotationally couples the first carrier to the output shaft when engaged, and wherein the second clutch selectively rotationally couples the first carrier to the output shaft when engaged.

4. The drive system of claim 1, wherein the first clutch and the second clutch are positioned to be engaged in the alternative.

5. The drive system of claim 1, further comprising a third clutch selectively rotationally coupling the second electrical machine to the connecting shaft when engaged.

6. The drive system of claim 1, further comprising a jack shaft radially offset from the connecting shaft and the output shaft, wherein the first clutch and the second clutch selectively rotationally couple the first gear set to the jack shaft when engaged, and wherein the jack shaft is rotationally coupled to the second carrier and the output shaft.

7. The drive system of claim 6, further comprising a brake positioned to selectively limit rotational movement of the second ring gear.

8. The drive system of claim 7, further comprising a fourth clutch selectively rotationally coupling the second ring gear to the jack shaft when engaged, wherein the fourth clutch and the brake are positioned to selectively cooperatively limit rotational movement of the jack shaft, the output shaft, and at least a portion of at least one of the first gear set and the second gear set.

9. The drive system of claim 1, wherein the second carrier is directly rotationally coupled to the output shaft.

10. A drive system for a vehicle, comprising:
a first planetary gear set;
a second planetary gear set selectively coupled to the first planetary gear set;
a connecting shaft directly coupled to the first planetary gear set;
a first electromagnetic device directly coupled to the first planetary gear set;
a second electromagnetic device directly coupled to the second planetary gear set and at least selectively rotationally coupled to the connecting shaft;
an output aligned with the first planetary gear set, the second planetary gear set, and the connecting shaft to thereby form a straight-thru transmission arrangement;
an auxiliary shaft radially offset from the connecting shaft and the output, wherein the auxiliary shaft is rotationally coupled to the output and the second planetary gear set; and
a clutch positioned to selectively rotationally couple the first planetary gear set to the auxiliary shaft when engaged.

11. The drive system of claim 10, wherein the first electromagnetic device includes a first shaft coupled to the first planetary gear set and the second electromagnetic device includes a second shaft coupled to the second planetary gear set, wherein the first shaft and the second shaft are aligned with the output.

12. The drive system of claim 10, the clutch defining a first clutch, wherein the connecting shaft extends through the first electromagnetic device to a second clutch, wherein the second clutch is positioned to selectively rotationally couple the second electromagnetic device to the connecting shaft when engaged.

13. The drive system of claim 10, the clutch defining a first clutch, further comprising a second clutch positioned to selectively rotationally couple the first planetary gear set to the auxiliary shaft when engaged.

14. The drive system of claim 13, wherein the first clutch is configured to be engaged when the drive system is selectively reconfigured into a forward mode of operation, and wherein the second clutch is configured to be engaged when the drive system is selectively reconfigured into a reverse mode of operation.

15. The drive system of claim 10, the clutch defining a first clutch, further comprising a brake and a second clutch positioned to selectively limit rotation of the auxiliary shaft and at least a portion of the second planetary gear set when engaged, wherein the drive system is selectively reconfigurable into a neutral/startup mode whereby the brake, the first clutch, and the second clutch are engaged such that rotational movement of at least a portion of the first planetary gear set is selectively limited and a rotation of the first electromagnetic device rotates the connecting shaft.

16. The drive system of claim 10, wherein the first electromagnetic device and the second electromagnetic device are disposed between the first planetary gear set and the second planetary gear set.

17. A vehicle, comprising:
a multi-mode transmission including:
- a first gear set and a second gear set, the first gear set comprising a planetary gear set having a planetary gear carrier, and the second gear set comprising a planetary gear set having a ring gear, wherein the planetary gear carrier and the second gear set are selectively rotatably coupled;
- a first motor/generator coupled to the first gear set;
- a second motor/generator coupled to the second gear set; and
- an output shaft selectively coupled to the first gear set and the first motor/generator;

a connecting shaft directly coupled to the first gear set and selectively coupled to the second gear set;
a drive axle coupled to the output shaft of the multi-mode transmission;
a brake positioned to selectively limit rotation of the ring gear when engaged;
a first clutch positioned to selectively couple the planetary gear carrier to an intermediate shaft, wherein the second gear set and the output shaft are rotatably coupled to the intermediate shaft;
a second clutch positioned to selectively couple the second motor/generator to the connecting shaft; and
a third clutch positioned to selectively couple the second gear set to the intermediate shaft,
wherein during a low range mode of the multi-mode transmission the first clutch and the third clutch are engaged, wherein during a mid range mode of the multi-mode transmission the first clutch and the brake of the second gear set are engaged, wherein during a high range mode of operation of the multi-mode transmission the first clutch and the second clutch are engaged.

* * * * *